United States Patent
Abe

(10) Patent No.: US 9,450,922 B2
(45) Date of Patent: Sep. 20, 2016

(54) PERIPHERAL APPARATUS, INFORMATION PROCESSING APPARATUS, COMMUNICATION CONTROL METHOD, AND STORAGE MEDIUM

(75) Inventor: Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 319 days.

(21) Appl. No.: 13/571,759

(22) Filed: Aug. 10, 2012

(65) Prior Publication Data

US 2013/0046970 A1 Feb. 21, 2013

(30) Foreign Application Priority Data

Aug. 19, 2011 (JP) .................................. 2011-179798

(51) Int. Cl.
*H04L 29/06* (2006.01)

(52) U.S. Cl.
CPC ......... *H04L 63/0428* (2013.01); *H04L 63/168* (2013.01)

(58) Field of Classification Search
CPC ............. H04L 63/168; H04L 63/0428; H04L 63/164; H04L 63/08; G06F 21/88; G06F 21/60; G06F 2221/2107; G06F 21/606; G06F 21/608; G06F 21/34; G06F 21/6218
USPC .......................................... 713/152; 726/14
See application file for complete search history.

(56) References Cited

U.S. PATENT DOCUMENTS

| | | | | |
|---|---|---|---|---|
| 2003/0078965 | A1* | 4/2003 | Cocotis et al. | 709/203 |
| 2003/0231767 | A1* | 12/2003 | Carbajal | 380/200 |
| 2005/0046876 | A1* | 3/2005 | Burget et al. | 358/1.1 |
| 2005/0198284 | A1* | 9/2005 | Bunn et al. | 709/225 |
| 2011/0317199 | A1* | 12/2011 | Makishima et al. | 358/1.13 |
| 2013/0016377 | A1* | 1/2013 | Meiyappan | 358/1.9 |

FOREIGN PATENT DOCUMENTS

JP 2005-100340 A 4/2005

OTHER PUBLICATIONS

Introduction—Cloud Print—Google Developers. Webpage. pp. 1-4. Google.com. USA. (Description as to Google Cloud Print open to the public through code.google.com/apis/cloudprint/docs/overview.html).

* cited by examiner

*Primary Examiner* — Ali Abyaneh
(74) *Attorney, Agent, or Firm* — Canon USA, Inc. IP Division

(57) ABSTRACT

A peripheral apparatus is communicably connected to a management apparatus. The management apparatus manages information of jobs in services provided from a providing apparatus via a network to execute processing of the jobs. The peripheral apparatus includes a communication unit. The communication unit transmits, in a series of processes in the services, checking information used to determine whether there is any job in the management apparatus to the management apparatus by a communication method that does not execute encryption. The communication unit transmits, in the series of processes in the services, other information different from the checking information to the management apparatus by a communication method that executes encryption.

11 Claims, 17 Drawing Sheets

← → INDICATES ADDRESS DATA BUS.

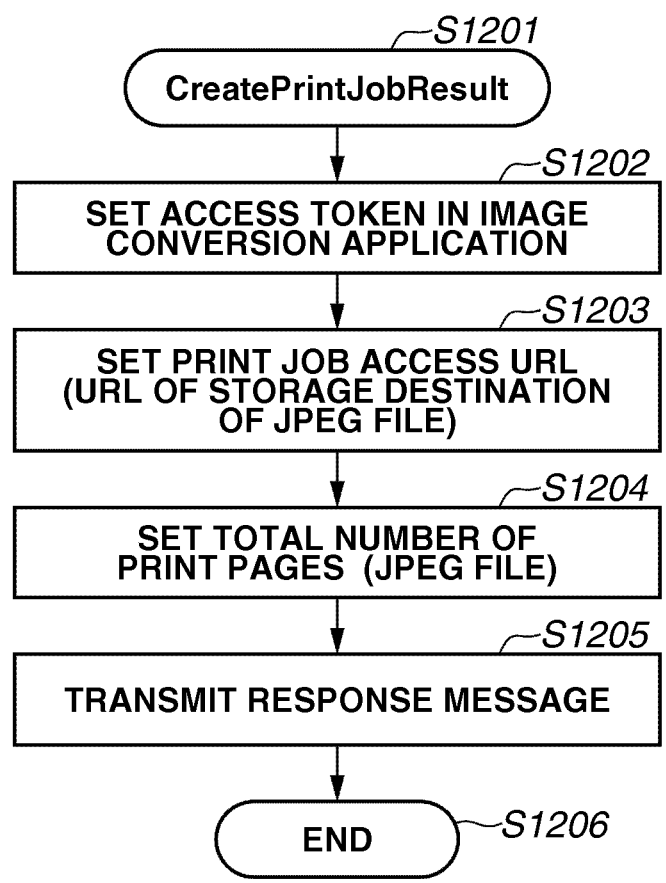

PERIPHERAL APPARATUS, INFORMATION PROCESSING APPARATUS, COMMUNICATION CONTROL METHOD, AND STORAGE MEDIUM

BACKGROUND OF THE INVENTION

1. Field of the Invention

The present invention relates to a peripheral apparatus, an information processing apparatus, a communication control method, and a storage medium 2. Description of the Related Art Recently, peripheral apparatus control systems having peripheral apparatuses connected to information apparatuses have effectively been used in various places such as home and an office. These systems are using various interfaces such as a universal serial bus (USB), Ethernet (registered trademark), and a wireless local area network (LAN). Examples of the peripheral apparatuses are a printer, a copying machine, a facsimile, a scanner, a digital camera, and a multifunction peripheral (MFP) combining these apparatuses. For the printer and the multifunction peripheral among these peripheral apparatuses, Google, Inc., provides cloud printing services referred to as Google Cloud Print (GCP: registered trademark). The use of the cloud printing services allows a user to activate (use) a document creation application from a personal computer (PC) or a mobile device and print a document by the printer or the multifunction peripheral via the Internet. A printing procedure using the GCP is as follows.

(1) The user opens a certain document by using the document creation application installed in the PC.

(2) To print the document by the printer, the user opens a print dialog to select the printer, and executes printing.

(3) The document creation application generates a print image as a Portable Document Format (PDF) file.

(4) The GCP generates a job from a print setting value selected in the print dialog and the PDF file, stores the print job in a print queue allocated to the printer in the GCP, and notifies the printer of the print job.

(5) After reception of print job, the printer acquires the print job, and prints the print image of the PDF file according to the print setting value.

For example, in the case of a printer or a multifunction peripheral that can render the PDF file, the printer or the multifunction peripheral can print the print image by using the GCP according to the procedure. However, in the case of an inexpensive printer or multifunction peripheral that cannot render the PDF file, the inexpensive printer or multifunction peripheral cannot print the print image of the PDF file in (5). To print the print image in such an inexpensive printer or multifunction peripheral by using the GCP, there is a web application (image conversion service) application for converting the PDF file into an image format of, for example, a Joint Photographic Experts Group (JPEG) file, to allow printing by the inexpensive printer or multifunction peripheral. Accordingly, there is a peripheral apparatus control system that converts the PDF file into a JPEG file by using the image conversion service application to print the print image by the inexpensive printer or multifunction peripheral.

Japanese Patent Application Laid-Open No. 2005-100340 discusses another technology relating to web print services. In the print services discussed in Japanese Patent Application Laid-Open No. 2005-100340, printing is achieved at a printer installed in an arbitrary place by using the following method. This printing is realized by a method for exchanging print reservation data or printable application information between print environment sharing services arranged at respective places to provide a printing place to the user. The technology discussed in Japanese Patent Application Laid-Open No. 2005-100340 enables the user to print the print image by the printer installed in the arbitrary remote place.

SUMMARY OF THE INVENTION

According to an aspect of the present invention, a peripheral apparatus communicably connected to a management apparatus, wherein the management apparatus manages information of jobs in services provided from a providing apparatus via a network to execute processing of the jobs, the peripheral apparatus includes a communication unit configured to transmit, in a series of processes in the services, checking information used to determine whether there is any job in the management apparatus to the management apparatus by a communication method that does not execute encryption, and transmit, in the series of processes in the services, other information different from the checking information to the management apparatus by a communication method that executes encryption.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 is an exemplary flowchart illustrating processing of a Create Print Job Result function.

DESCRIPTION OF THE EMBODIMENTS

Various exemplary embodiments, features, and aspects of the invention will be described in detail below with reference to the drawings. The embodiments are in no way limitative of the present invention. The components described in the embodiments are not always essential to solution of the present invention.

A POST method (example of a communication method) of Hypertext Transfer Protocol over Secure Socket Layer (HTTPS) encrypted by Secure Sockets Layer (SSL) communication may be used below in a web service application programming interface (API). Information regarding the POST method is open to the public, and thus detailed description thereof is omitted. The HTTPS is a known encrypted communication protocol, and thus detailed description thereof is omitted. The SSL is a known method for encrypting data in the Internet to transmit or receive it, and thus detailed description thereof is omitted. Further, a GET method (example of a communication method) of Hypertext Transfer Protocol (HTTP) may be used in the web service API. Information regarding the GET method is open to the public, and thus detailed description thereof is omitted. The HTTP is a known unencrypted communication protocol, and thus detailed description thereof is omitted.

Figure 1:
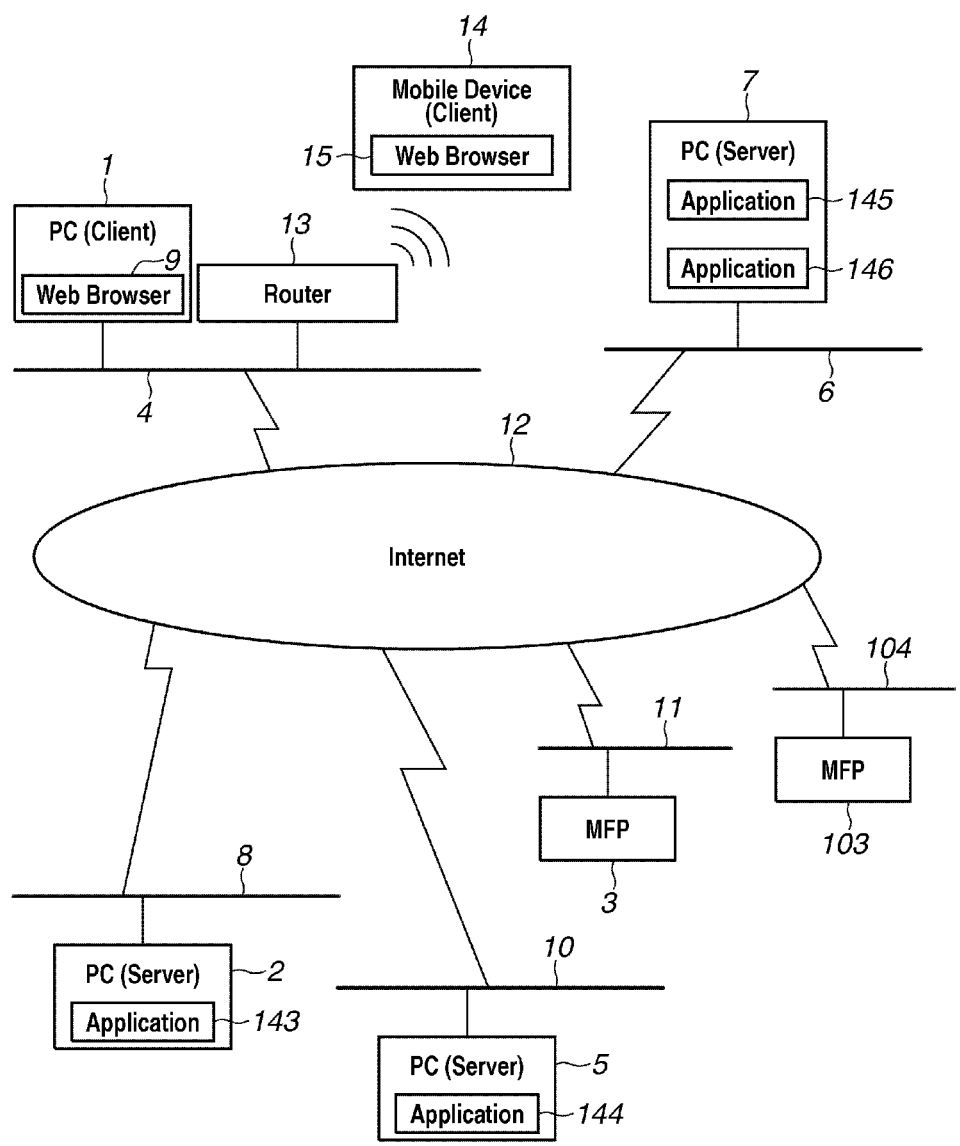
FIG. 1 illustrates an example of a configuration of a peripheral apparatus control system.

A GET method (example of a communication method) of HTTPS encrypted by SSL communication may be used in the web service API. Information regarding the GET method is open to the public, and thus detailed description thereof is omitted. The HTTPS is a known encrypted communication protocol, and thus detailed description thereof is omitted. Description as to the GCP is open to the public through the following site, and thus detailed description thereof is omitted:

Internet uniform resource locator (URL): code.google.com/apis/cloudprint/docs/overview.html A first exemplary embodiment will be described. FIG. 1 illustrates an example (peripheral apparatus control system) of a configuration of a system that includes an information processing apparatus and a peripheral apparatus. Each of a PC 1, PC 2, a PC 5, and a PC 7 is an example of an information processing apparatus (computer), for example, a general personal computer. Each of a PC 1, PC 2, a PC 5, and a PC 7 includes hardware components illustrated in FIG. 2A.

In the PC 1, there is installed an operating system (OS) equivalent to Chrome (registered trademark) of Google Inc. In each of the PC 2 and PC 5, there is installed an OS for Server of Windows (registered trademark) of Microsoft Corporation. In the PC 7, there is installed an OS equivalent to Linux (registered trademark). The PC 1, the PC 2, the PC 5, and the PC 7 are respectively connected to networks 4, 8, 10, and 6 each including an interface (I/F) such as Ethernet, and also to the Internet 12.

Each of multifunction printers (MFPs) 3 and 103 is an example of a peripheral apparatus (computer) that includes a color ink jet printer, a color facsimile, a color scanner, and an external storage for a flash memory. The MFPs 3 and 103 have model names of Kmmn by ABC Inc. For the peripheral apparatus, an apparatus that includes a printer, a copying machine, a facsimile, a scanner, a digital camera, or a multifunction peripheral of these apparatuses can be used. Each of the MFP 3 and the MFP 103 includes hardware components illustrated in FIG. 2B. The MFP 3 is connected to a network 11 that is Ethernet and also to the Internet 12. The MFP 103 is connected to a network 104 that is Ethernet and also to the Internet 12.

A router 13 is, for example, a broadband router (Wi-Fi BB router) that includes a wireless LAN of Wi-Fi (registered trademark), and is connected to the Internet 12. A mobile device 14 is a portable telephone or a portable information terminal. The mobile device 14 is connected to the router 13, and to the Internet 12 via the router 13. The PC 1, the PC2, the PC 5, the PC 7, the mobile device 14, the MFP 3, and the MFP 103 can perform bidirectional communication among themselves via the Internet 12 (communicably connected). A web browser 9 is installed in the PC 1, and a web browser 15 is installed in the mobile device 14.

An application 145 is a document creation application (document creation APP 145) using web services. An application 146 is an application for providing cloud printing services (cloud printing APP 146) using web services. The cloud printing APP 146 has, for example, a function similar to that of the GCP provided by Google Inc. By using the cloud printing services, the document creation APP 145 is executed by the web browser 9 in the PC 1 or the web browser 15 in the mobile device to open a certain document, and then the document can be printed by the MFP 3 or the MFP 103.

Figure 4:
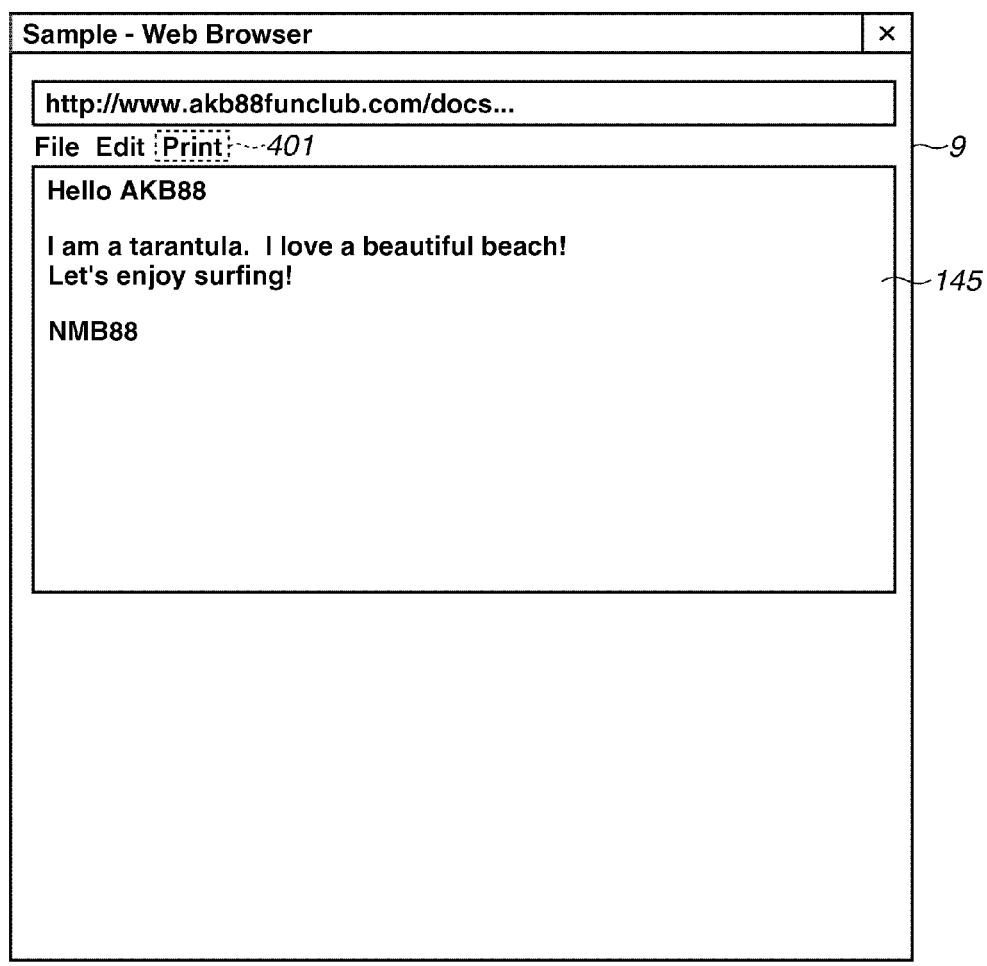
FIG. 4 illustrates an example of a web browser.
Figure 5:
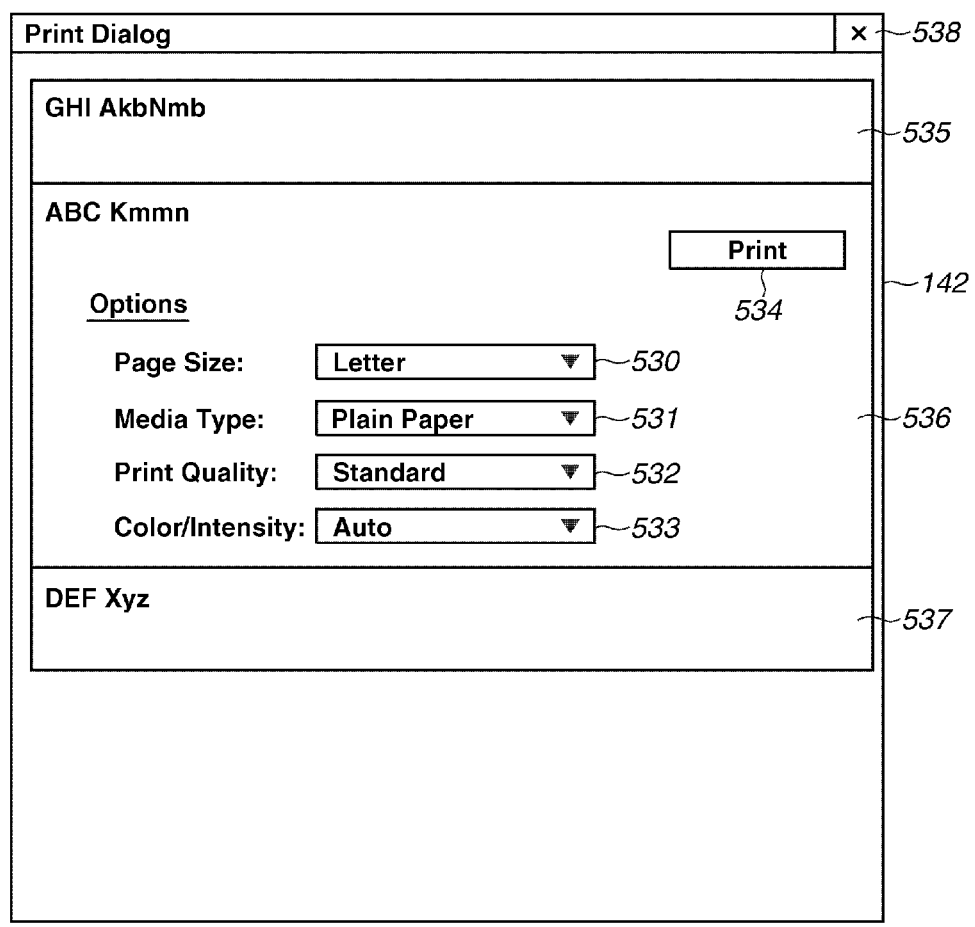
FIG. 5 illustrates an example of a print dialog.

For example, when a user selects a print menu 401 illustrated in FIG. 4 to print the opened document, the cloud printing APP 146 displays a print dialog 142 illustrated in FIG. 5. When the user selects a printer in the print dialog 142, and presses a print button 534 to instruct execution of printing, the document creation APP 145 generates a print image as a PDF file.

Then, the cloud printing APP 146 generates a print job based on the print image (PDF file) and a print setting value selected in the print dialog 142, and stores the print job in a print queue for the printer selected in the cloud printing services. Further, the cloud printing APP 146 transmits a print job notification to the printer (proxy APP 143 in the exemplary embodiment described below).

When the printer or the MFP has a function of rendering the page description language (PDL) file, the printer or the MFP can print the print job stored in the print queue. However, many inexpensive ink jet printer or MFPs do not have functions of rendering PDF files. Thus, when such a printer prints the print job stored in the print queue, the print image of the PDF file is converted into an image format of a type to be rendered, such as a MPEG file, by the inexpensive printer (example of preprocessing).

An application 143 is an application (proxy APP 143) for providing cloud printing proxy services to associate the MFP 3 or the MFP 103 with the cloud printing services provided by the cloud printing APP 146. The proxy APP 143 installed in the PC 2 can manage 5000 printers or MFPs at a time to associate each printer or MFP with the cloud printing services provided by the cloud printing APP 146. An application 144 is an application (image conversion APP 144) for providing image conversion services to convert the PDF file into a JPEG file.

To use the cloud printing services provided by the cloud printing APP 146, logging-in using a user account and a password is necessary. When registering the printer or the MFP usable for printing in the cloud printing services, the cloud printing APP 146 first acquires an access token for using the cloud printing services by using the user account and the password. The cloud printing APP 146 then registers the printer or the MFP in association with the user account. During the registration of the printer or the MFP, the cloud printing APP 146 issues and allocates printer ID represented by a unique value to each printer or MFP, and notifies the registration target printer of the printer ID. Detailed description of processing for registering the printer is omitted.

Figure 2A:
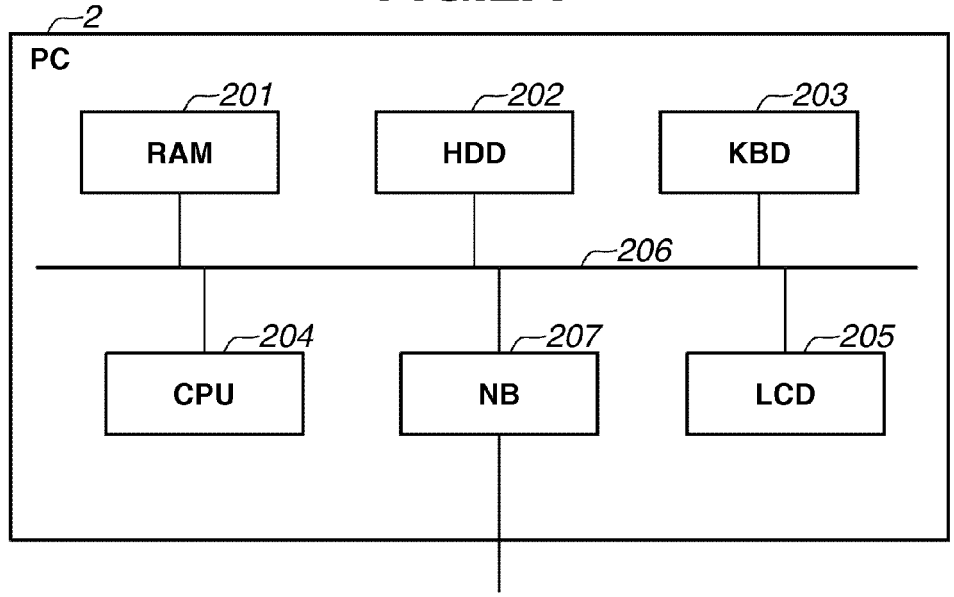
FIGS. 2A and 2B illustrate examples of hardware configurations of a PC and a MFP.
Figure 2B:
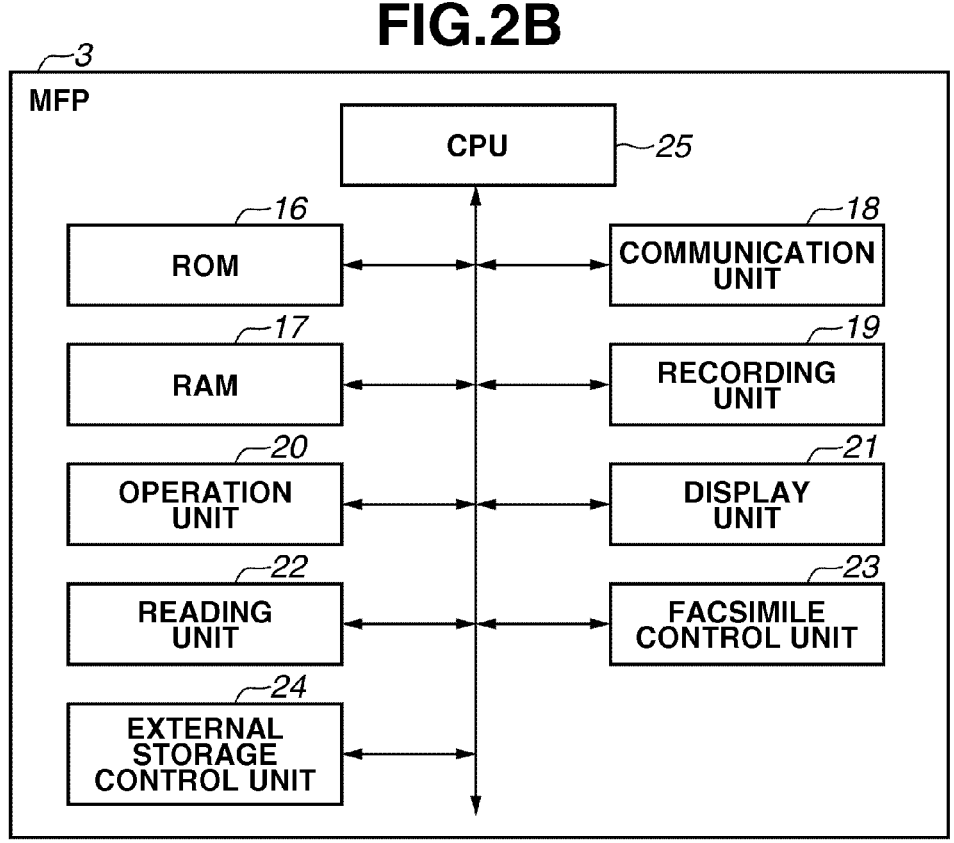

FIGS. 2A and 2B illustrate examples of hardware configurations of a PC and a MFP. Each of the PC 1, the PC 2, the PC 5, and the PC 7 includes hardware components illustrated in FIG. 2A. FIG. 2A illustrates an example of the PC 2. The PC 2 includes a random access memory (RAM) 201, a hard disk drive (HDD) 202, a keyboard (KBD) 203, a central processing unit (CPU) 204, a display (LCD) 205, and a network board (NB) 207. The PC 2 further includes a bus 206 for interconnecting the components.

Figure 3:
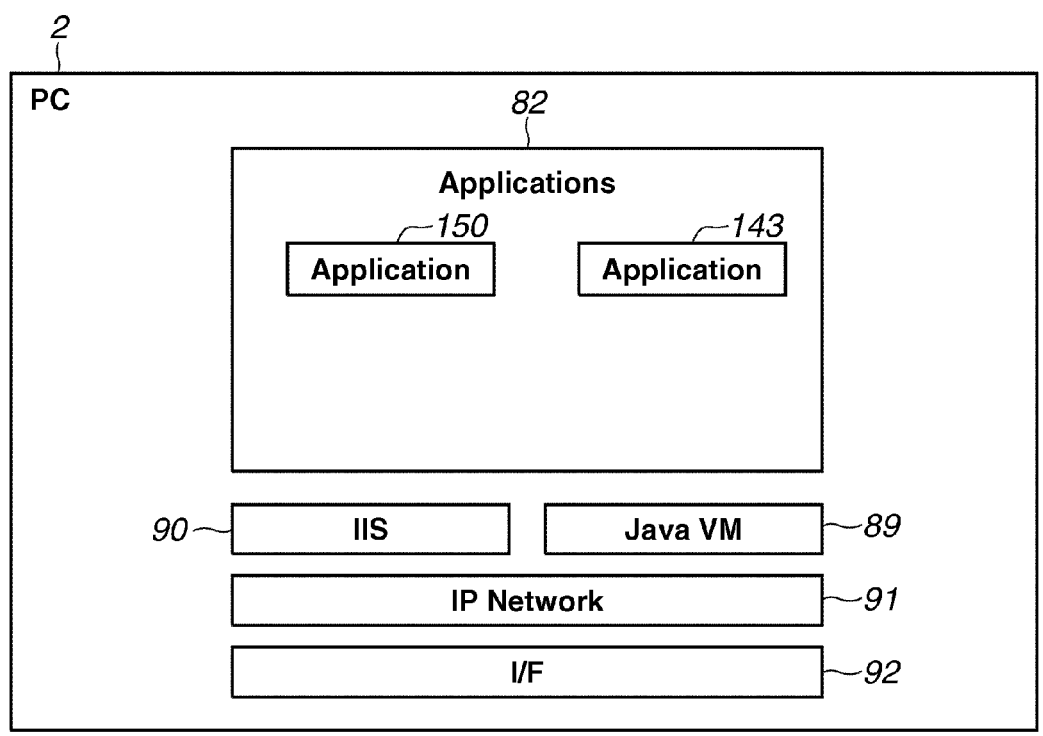
FIG. 3 illustrates an example of a software configuration of the PC.

The HDD 202 is an example of a storage unit. The storage unit can be a portable compact disk read-only memory (CD-ROM) or a ROM installed inside. The KBD 203 is an example of an input unit. The CPU 204 is an example of a control unit. The LCD 205 is an example of a display unit. The NB 207 is an example of a communication control unit. The proxy ALL 143 and a program of each module (software) illustrated in FIG. 3 are stored in the HDD 202, and read to the RAM 201 to be executed by the CPU 205 when necessary. Various databases (DBs) are stored in the HDD 202, and information of the DB is read to the RAM 201 by the CPU 204 when necessary.

Each of the MFP 3 and the MFP 103 includes hardware components illustrated in FIG. 2B. FIG. 2B illustrates an example of the MFP 3. A CPU 25 includes a microprocessor. The CPU 25 controls, as a central processing unit of the MFP 3, a RAM 17, a communication unit 18, a recording unit 19, an operation unit 20, a display unit 21, a reading unit 22, a facsimile control unit 23, and an external storage control unit 24 according to a program stored in a ROM 16.

The ROM 16 stores a program to execute recording (printing) processing and processing of notifying the PC of a printing operation state performed by the MFP 3 under control of a printer driver (not illustrated). The ROM 16 stores a program to execute facsimile transmission processing or reception processing, and processing of notifying the PC of a facsimile operation (transmission or reception) state performed by the MFP 3 under control of a facsimile driver (not illustrated). The ROM 16 further stores a program to execute image reading processing and processing of notifying the PC of a reading operation state performed by the MFP 3 under control of a Windows Image Acquisition (WIA) driver or a Tool Without An Interesting Name (TWAIN) driver (not illustrated).

The RAM 17 temporarily stores print data. The print data is mainly transmitted from the PC. The recording unit 19 executes printing based on the print data. The RAM 17 temporarily stores image data read by the reading unit 22, facsimile transmission data transmitted from the PC, and facsimile reception data received by the facsimile control unit 23. The communication unit 18 includes a connection port for a network 4 and a connection port for an analog telephone line, and controls Ethernet and facsimile analog communication. The recording unit 19 includes a recording unit that includes an ink jet recording head, each color ink, a carriage, and a recording paper conveyance mechanism, and an electric circuit such as an application specific integrated circuit (ASIC) for generating a printing pulse by the recording head based on the print data.

For example, by a printing operation on a printable application or a facsimile transmission operation, a display content (image data) of a file opened by the application is temporarily stored as a spool file of an enhanced metafile (EMF) format in the HDD 202 of the PC 2. Then, the spool file is converted into print data containing a control command of the MFP 3 or facsimile transmission data via the printer driver or the facsimile driver, and transmitted to the MFP 3 via the Internet.

The print data received by the MFP 3 is converted into a printing pulse by the recording unit 19 to be printed on recording paper. The facsimile transmission data received by the MFP 3 is converted into a facsimile communication protocol by the facsimile control unit 23, and transmitted to a facsimile device of an opposite side via the analog telephone line.

The operation unit 20, which includes various buttons including a power button and a reset button, receives an operation for the MFP 3. The display unit 21, which includes a touch panel liquid crystal display, can display a state of the MFP, and display and input various pieces of setting information or a telephone number. The reading unit 22, which includes a color image sensor and an electric circuit such as ASIC for image processing, controls a scanner function. The facsimile control unit 23, which includes a facsimile modem and an analog communication circuit, controls facsimile transmission or reception according to the facsimile communication protocol. The external storage control unit 24, which includes a flash memory loading slot and a storage interface circuit, controls the loaded flash memory.

FIG. 3 illustrates an example of a software configuration of the PC. FIG. 3 illustrates an example of the PC 2. An I/F 92 is an I/F control stack for controlling an I/F of Ethernet. An Internet protocol (IP) Network 9 is an IP Network control stack for controlling an IP Network. Internet information services (IIS) 90 is an ISS control unit that controls IIS. An application 150 provides web services by using a web server function of the IIS control unit. A JAVA (registered trademark) virtual machine (Java VM) 89 is software for converting a Java byte code into a platform native code to execute it, and the proxy APP 143 is executed on the JAVA VM 89. Applications 82 are an application group that includes the proxy APP 143 and the application 150.

FIG. 4 illustrates the web browser 9 provided by the document creation APP 145 of the PC 1 as an example. FIG. 4 illustrates an opened state of a certain document. The print menu 401 receives various operations regarding printing. For example, when the user operates the input unit such as the KBD 203 (user operation) and presses the print menu 401 to print the opened document, the print dialog illustrated in FIG. 5 is displayed.

FIG. 5 illustrates the print dialog 142 as an example. The print dialog 142 serves as a print setting screen for the MFP 3 or the MFP 103 for the user under control of the cloud printing APP 146. The print dialog 142 is displayed on the web browser by using the web browser 9 or 15. Printer choices 535, 536, and 537 are selectable. The printer choices 535, 536, and 537 respectively indicate a printer having a model name of AkbNmb By GHI Inc., a MFP (MFP 3) having a model name of Kmmn by ABC Inc., and a printer having a model name of Xyz by DEF Inc. FIG. 5 illustrates a state where the printer choice 536 indicating the MFP 3 is selected.

A sheet size selection unit 530 selects a sheet size for printing in the MFP 3 among choices described below according to a user's operation. FIG. 5 illustrates a state where a Letter size is selected.

Sheet size choices: A5, A4, B5, and Letter

A sheet type selection unit 531 selects a sheet type for printing in the MFP 3 among choices described below according to a user's operation. FIG. 5 illustrates a state where plain paper is selected.

Sheet type choices: plain paper, photo paper, and postcard

A print quality selection unit 532 selects print quality for printing in the MFP 3 among choices described below according to a user's operation. FIG. 5 illustrates a state where standard is selected.

Print quality choices: high, standard, and fast

A color/density selection unit 533 selects a color or a density for printing in the MFP 3 among choices described below according to a user's operation. FIG. 5 illustrates a state where auto is selected.

Print quality choices: auto, and manual

The print button 534 receives a printing start instruction. When the print button 534 is pressed by a user's operation, the cloud printing APP 146 generates a print job for the MFP 3 associated with the printer choice 536. A close button 538 receives an instruction to close the print dialog 142. When the close button 538 is pressed by a user's operation, the cloud printing APP 146 closes the print dialog 142.

Figure 6:
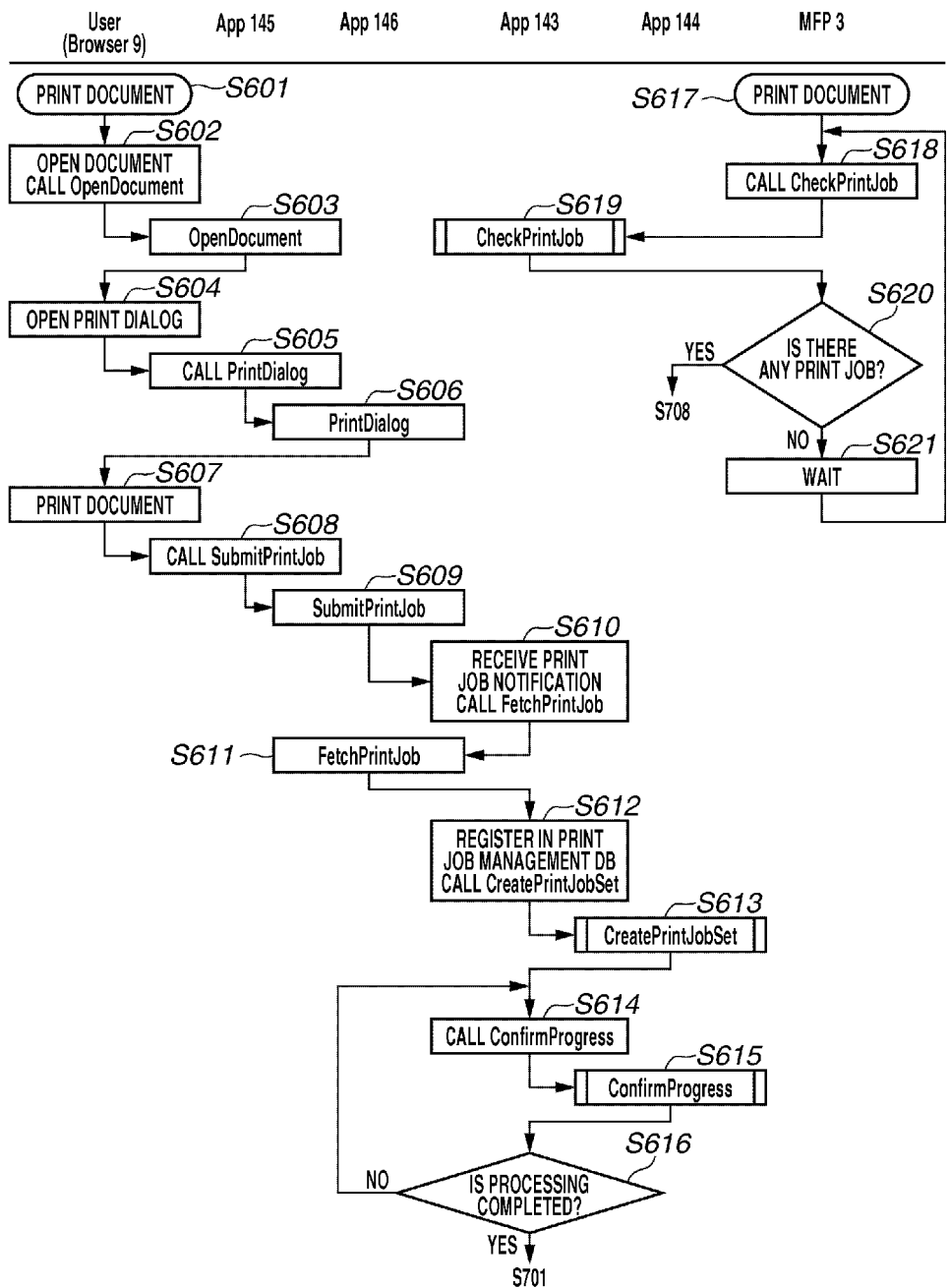
FIG. 6 is an exemplary flowchart illustrating processing of the entire peripheral apparatus control system.
Figure 7:
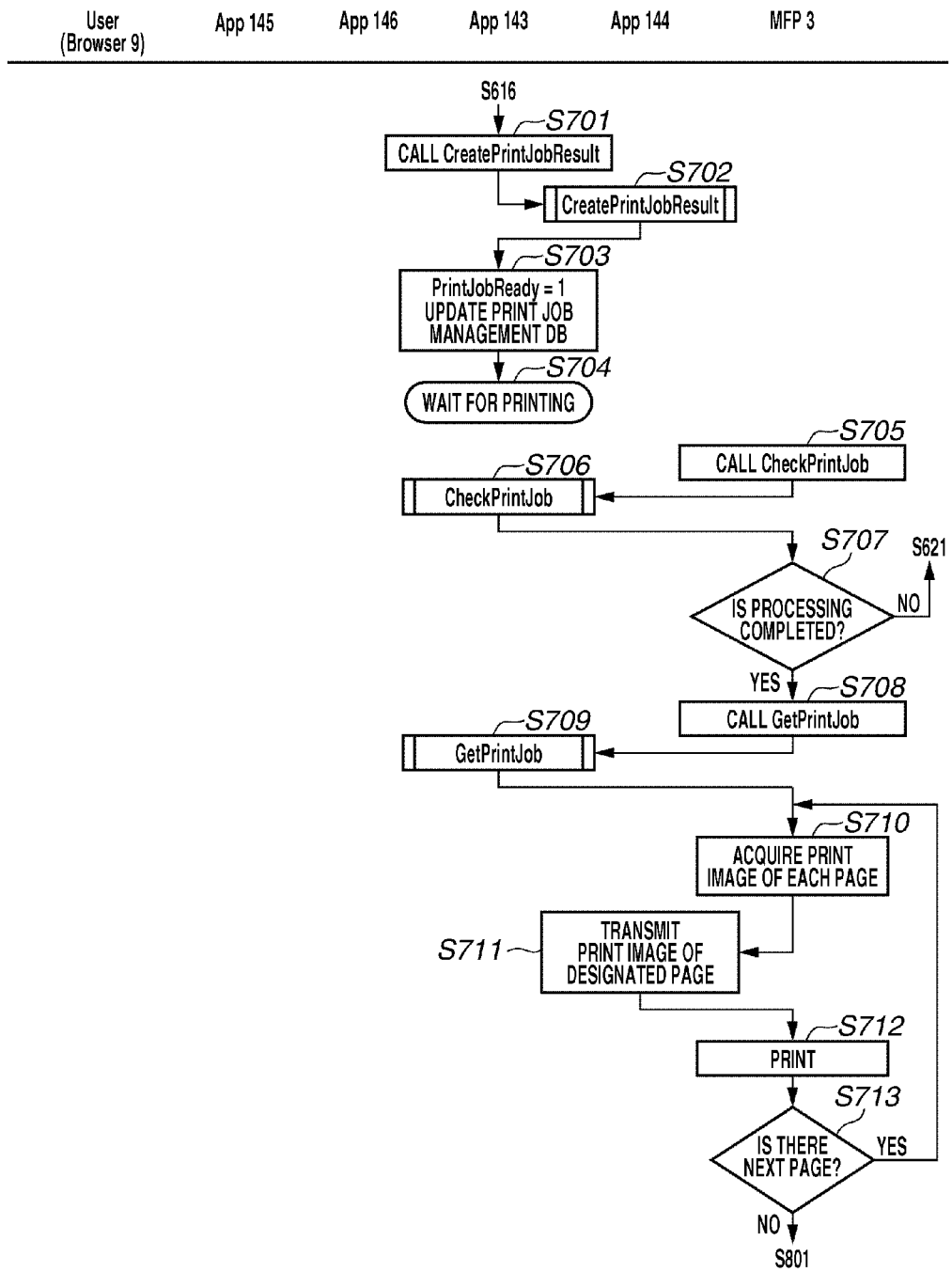
FIG. 7 is an exemplary flowchart illustrating processing of the entire peripheral apparatus control system.
Figure 8:
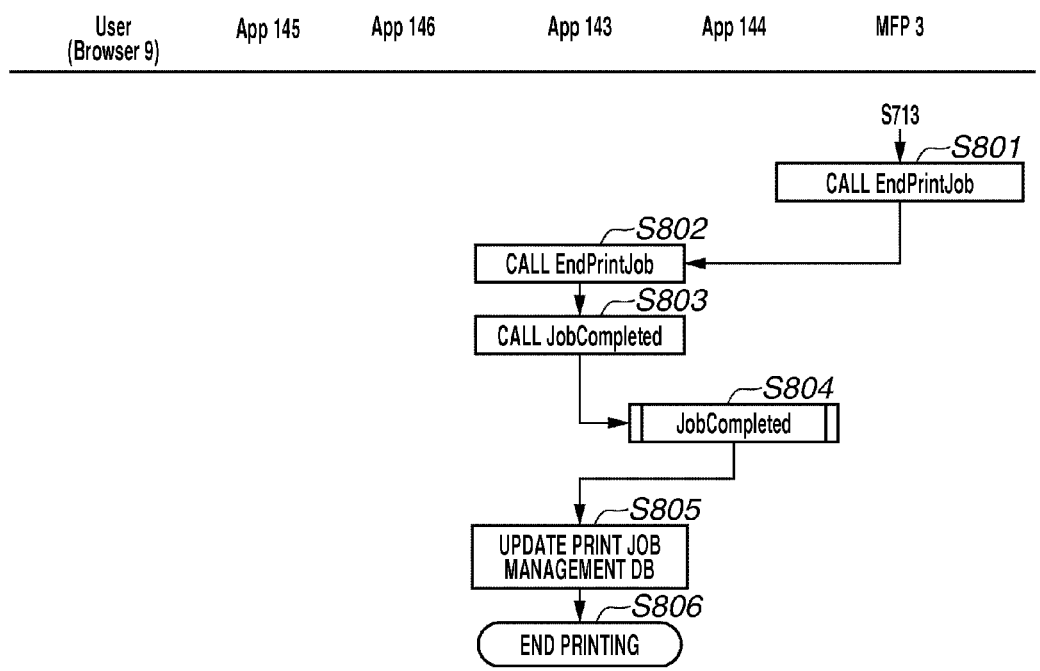
FIG. 8 is an exemplary flowchart illustrating processing of the entire peripheral apparatus control system.

FIGS. 6 to 8 are exemplary flowcharts each illustrating processing of the entire peripheral apparatus control system. Programs of these flowcharts are installed in the PC or the MFP. A program of an application operable in the PC is stored in the HDD 202, and read to the RAM 201 to be executed by the CPU 204. A program of an application operable in the MFP is stored in the ROM 16, and read to the RAM 17 to be executed by the CPU 25.

In the flowcharts, a vertical row indicates an executing member of the processing. In the exemplary embodiment, from the left side of each drawing, there are a user (web browser 9), a document creation APP 145, a cloud printing APP 146, a proxy APP 143, an image conversion APP 144, and a MFP 3. Hereinafter, a communication control method will be described by taking an example of a case where the user prints a document at the MFP 3 using the PC 1 (a series of processes regarding document printing).

First, a configuration where the MFP 3 executes polling for a print job will be described by using steps S617 to S621. In FIG. 6, in step S617, printing of a document is started as seen from the MFP 3 side for the sake of convenience. This step, which has no influence on execution of processing in the MFP 3, indicates the start of processing of the flowchart.

In step S618, the MFP 3 calls a Check Print Job function of the web service API exported from the proxy APP 143. Information (example of checking information) transmitted as a query parameter of a GET request of HTTP when the MFP 3 calls the function in step S618 is as follows:

printer ID issued from cloud printing APP 146
    random code

Timing of calling the Check Print Job function is arbitrary, and as a form of polling, the MFP 3 periodically calls the function. However, this form is in no way limitative. For example, the function may be called when instructed by the user. Further, the checking information included in the query parameter is not limited to the printer ID or the random code.

The random code is an arbitrary 32-bit value generated by the MFP 3. In step S619, after the Check Print Job function has been called, the proxy APP 143 executes processing of the Check Print Job function, and returns its response (example of response information) to the MFP 3. Then, in step S620, the MFP 3, which has received the response of the Check Print Job function from the proxy APP 143, checks information ("there is print job" or "there is no print job") contained in a response message within the response. When it is determined that the response of "there is print job" has been received (YES in step S620), the MFP 3 advances the processing to step S708 illustrated in FIG. 7. On the other hand, when it is determined that the response of "there is no print job" has been received (NO in step S620), the MFP 3 advances the processing to step S621. In step S621, after the passage of a certain period (1 minute in the exemplary embodiment), the MFP 3 advances the processing to step S618. Thus, the MFP 3 polls the Check Print Job function exported from the proxy APP 14 at a certain time interval (periodically).

Next, document printing processing will be described. Step S601 indicates a start of document printing as seen from the user side for convenience. This step, which has no influence on a user's operation or execution of an application, indicates the start of the processing of the flowchart. First, the user activates the web browser 9, and accesses the URL of the document creation APP 145 to log in. Then, in step S602, when the user designates a certain document and instructs its opening, the web browser 9 calls an Open Document function of the web service API exported from the document creation APP 145 by using the document as an input parameter. In step S603, after the Open Document function has been called, the document creation APP 145 opens the document designated by the input parameter to transmit its information to the web browser 9. For example, as illustrated in FIG. 4, the document is opened on the web browser 9 via the document creation APP 145.

In step S604, when the print menu 401 is pressed to print the document by a user's operation, the document creation APP 145 is notified of its information via the web browser 9. In step S605, the document creation APP 145, which has received the notification, calls a Print Dialog function of the web service API exported from the cloud printing APP 146. In step S606, after the Print Dialog function has been called, the cloud printing APP 146 opens the print dialog 142 to transmit its information to the web browser 9. For example, as illustrated in FIG. 5, the print dialog 142 is displayed on the web browser 9.

The user operates the input unit to select a printer to be used (printer choice 536 associated with the MFP 3 in the example illustrated in FIG. 5) among a plurality of printer choices, selects a desired setting value among print setting values, and then presses the print button 534. In step S607, after the print button 534 has been pressed, the document creation APP 145 is notified of information indicating a printing start request from the user and information regarding the print setting value via the web browser 9. The information regarding the print setting value is, for example, a URL where a print setting file (extensible markup language (XML) file) describing the print setting value selected by the user is stored.

The document creation APP 145, which has received the notification, generates a print image as a PDF file. Then, in step S608, the document creation APP 145 calls a Submit Print Job function of the web service API exported from the cloud printing APP 146 by using the generated PDF file and the information regarding the print setting value as input parameters.

After the Submit Print Job function has been called, the cloud printing APP 146 generates a print job based on the PDF file and the information regarding the print setting value designated as the input parameters. Then, in step S609, the cloud printing APP 146 transmits a print job notification to a printer (in the example, which is the proxy APP 143 because the MFP 3 requires image format conversion) associated with the selected printer choice. The print job includes at least the following information (hereinafter, referred to as print job information):

print job ID issued from cloud printing APP 146
    printer ID issued from cloud printing APP 146
    access token for using cloud printing services provided by cloud printing APP 146
    URL where print setting file (XML file) describing print setting value is stored URL of storage destination of print image (PDF file)
time stamp In step S610, the proxy APP 143, which has received the print job notification, calls a Fetch Print Job function of the web service API exported from the cloud printing APP 146. In step S611, after the Fetch Print Job function has been called, the cloud printing APP 146 transmits information (print job information) included in the print job generated in step S609 to the proxy APP 143. In step S612, the proxy APP 143, which has received the print job information, acquires necessary information from the print job information, and stores the acquired information and information necessary for other controls in a print job management database. Then, the proxy APP 143 calls a Create Print Job Set function of the web service API exported from the image conversion APP 144.

Information (example of preprocessing information) transmitted to the image conversion APP 144 as an input parameter of a POST request of HTTPS when the proxy APP 143 calls the function in step S612 is as follows:
  printer ID issued from cloud printing APP 146
  print job ID issued from cloud printing APP 146
  access token for using cloud printing services
  URL of storage destination of print image (PDF file)
The information stored in the print job management database in step S612 is as follows:
[Print Job Management Database]
  search key: print job ID issued from cloud printing APP 146
  access token for using cloud printing services
  URL of storage destination of print setting file (XML file)
  URL of storage destination of print image (PDF file)
  access token to image conversion APP 144
  print job access URL (URL of storage destination of JPEG file)
  total number of pages of print image (JPEG file)
  print job preparation completion (Print Job Ready) (0: not completed, 1: completed)

In this case, the proxy APP 143 sets "0" as an initial value indicating incompletion of print job preparation in the print job preparation completion (Print Job Ready). The proxy APP 143 sets an initial value "0" in the total number of pages of print image (JPEG file). In step S613, after the Create Print Job Set function has been called, the image conversion APP 144 executes processing of the Create Print Job Set function described below referring to FIG. 10A, and returns its response to the proxy APP 143. This response includes session ID issued from the image conversion APP 144.

In step S614, the proxy APP 143, which has received the response of the Create Print Job Set function from the image conversion APP 144, calls a Confirm Progress function of the web services API exported from the image conversion APP 144. Information (example of checking information) transmitted to the image conversion APP 144 as an input parameter of a GET request of HTTP when the proxy APP 143 calls the function in step S614 is as follows:
  session ID
  sequence
The session ID is information included in the response of the Create Print Job Set function, and the sequence is an arbitrary number generated by the proxy APP 143.

In step S615, after the Confirm Progress function has been called, the image conversion APP 144 executes processing of the Confirm Progress function described below referring to FIG. 11A, and returns its response (example of response information) to the proxy APP 143. In step S616, the proxy APP 143, which has received the response of the Confirm Progress function from the image conversion APP 144, checks a content ("on-going processing", "processing completed", or "error") included in a response message within the response. When the proxy APP 143 determines that the response of "processing completed" has been received (YES in step S616), the processing proceeds to step S701 illustrated in FIG. 7. When it is determined that the response of "on-going processing" has been received (NO in step S616), the processing proceeds to step S614.

When an error occurs in processing of a download/image conversion thread of the image conversion APP 144 described below referring to FIG. 10A, in step S616, the proxy APP 143 receives the response of "error" to end the printing processing as an error. However, the case of error ending is outside the essence of the exemplary embodiment, and thus detailed description thereof is omitted. In steps S616 and after, processing mainly concerns a case where the proxy APP 143 receives the response of "processing completed" or the response of "error".

As illustrated in FIG. 7, in step S701, the proxy APP 143 calls a Create Print Job Result function of the web service API exported from the image conversion APP 144. Information (example of location acquisition information) transmitted to the image conversion APP 144 as an input parameter of a POST request of HTTPS when the proxy APP 143 calls the function in step S701 is as follows:
  printer ID issued from cloud printing APP 146
  print job ID issued from cloud printing APP 146

In step S702, after the Create Print Job Result function has been called, the image conversion APP 144 executes processing of the Create Print Job Result function described below referring to FIG. 12, and returns its response to the proxy APP 143. In step S703, the proxy APP 143, which has received the response of the Create Print Job Result function from the image conversion APP 144, sets "1" in the Print Job Ready. Then, the proxy APP 143 sets "1" indicating print job preparation completed in the print job preparation (Print Job Ready) of the print job management database. Thus, in step S704, a printing standby state is set in the MFP 3.

As described above in steps S618 to S621 illustrated in FIG. 6, the MFP 3 polls the Check Print Job function exported from the proxy APP 143 at the certain time interval, and step S705 is similar to step S618. A case where the MFP 3 calls the Check Print Job function exported from the proxy APP 143 in step S705 after the MFP 3 has been set in the printing standby state in step S704 will be described. In step S706, after the Check Print Job function has been called, the proxy APP 143 executes processing of the Check Print Job function described below referring to FIG. 9A, and returns its response to the MFP 3.

In step S707, the MFP 3, which has received the response of the Check Print Jon function from the proxy APP 143, checks a content ("there is job" or "there is no job") included in a response message within the response. When the MFP 3 determines that the response of "there is job" has been received (YES in step S707), the processing proceeds to step S708. On the other hand, when it is determined that the response of "there is no job" has been received (NO in step S707), the processing proceeds to step S621. In step S708, the MFP 3 calls a Get Print Job function of the web service API exported from the proxy APP 143. Information (example of acquisition information) transmitted to the proxy APP 144 as a query parameter of a Get request of HTTPS when the MFP 3 calls the function in step S708 is as follows:
  printer ID issued from cloud printing APP 146

In step S709, after the Get Print Job function has been called, the proxy APP 143 executes processing of the Get Print Job function described below referring to FIG. 9B, and returns its response to the MFP 3. In step S710, the MFP 3, which has received the response of the Get Create Print Job function from the proxy APP 143, transmits a print image acquisition request to the image conversion APP 144 based on a content included in a response message within the response. Contents included in the response message within the response are a print job access URL (URL of storage destination of print image (JPEG file)), a total number of pages of a print image (JPEG file), and an access token to the image conversion APP 144.

The print image acquisition request is made to acquire a print image (JPEG file) of each page from the image conversion APP 144. In the exemplary embodiment, the print job access URL is a storage destination URL of the PC 5 including the image conversion APP 144. However, it can be a storage destination URL of another PC. For example, for the print job access URL, a form of direct transmission from the PC 5 can be employed. Further, for example, a form where the PC 2 including the proxy APP 143 acquires a print image of a designated page from the PC 5 and transmits the acquired print image to the MFP 3 can be employed. Furthermore, for example, the PC 2 can transmit the URL of the storage destination of the acquired print image to the MFP 3.

In step S711, the image conversion APP 144, which has received the print image acquisition request from the MFP 3, permits access to the print image (JPEG file) of the designated page from the MFP 3, and transmits the print image to the MFP 3. In step S712, the MFP 3, which has received the print image transmitted from the image conversion APP 144, prints the print image. Then, in step S713, the MFP 3 checks whether there is a next page based on the total number of pages of the print image (JPEG file). When there is the next page (YES in step S713), the MFP 3 advances the processing to step S710, and transmits a print image acquisition request to acquire a print image of the next page. On the other hand, when there is no next page (NO in step S713), the MFP 3 advances the processing to step S801 illustrated in FIG. 8. For the acquisition processing of the print image (JPEG file) in steps S710 to S712, a GET method of HTTPS encrypted by SSL communication is used.

As illustrated in FIG. 8, in step S801, the MFP 3 calls an End Print Job function of the web service API exported from the proxy APP 143. To call the End Print Job function, the GET method of HTTPS encrypted by the SSL communication is used. Information (example of end information) transmitted to the proxy APP 143 as a query parameter of a GET request of HTTPS when the MFP 3 calls the function in step S801 is as follows:

printer ID issued from cloud printing APP 146
print job ID issued from cloud printing APP 146

In step S802, after the End Print Job function has been called, the proxy APP 143 calls a Job Completed function of the web service API exported from the image conversion APP 144. Information (example of job processing end information) transmitted to the image conversion APP 144 as an input parameter of a POST request of HTTPS when the proxy APP 143 calls the function in step S803 is as follows:

printer ID issued from cloud printing APP 146
print job ID issued from cloud printing APP 146

In step S804, after the Job Completed function has been called, the image conversion APP 144 executes processing of the Job Completed function described below referring to FIG. 11B, and returns its response to the proxy APP 143. In step S805, the proxy APP 143, which has received the response of the Job Completed function from the image conversion APP 144, deletes information regarding the print job from the print job management database to update the print job management database. In step S806, the proxy APP 143 ends the document printing processing.

Figure 9A:
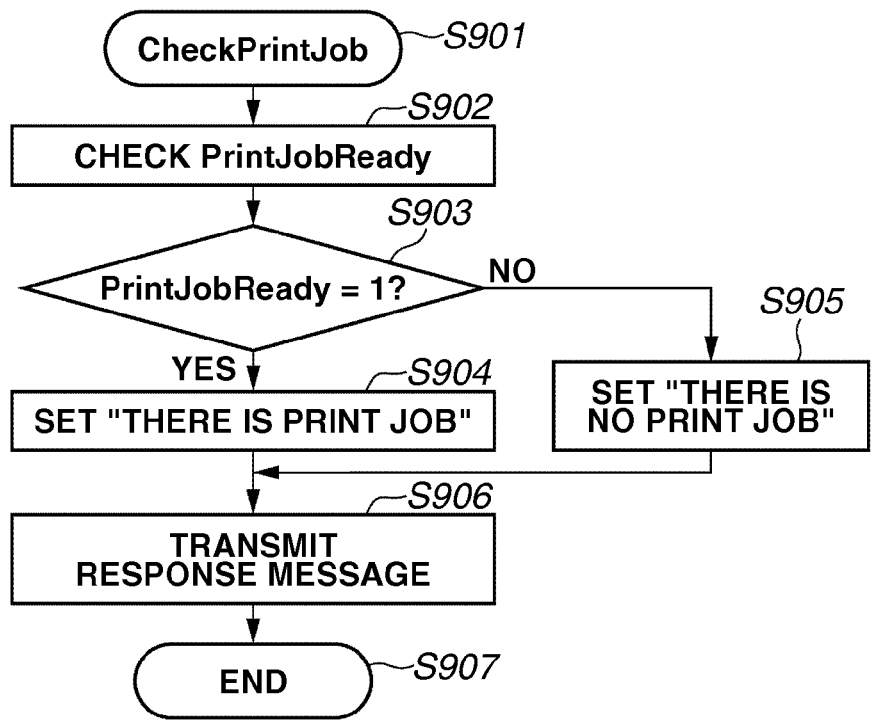
FIGS. 9A and 9B are exemplary flowcharts illustrating processing of a proxy application (APP).

Next, referring to FIGS. 9A and 9B, processing of the web service API exported from the proxy APP 143 will be described. FIG. 9A is an exemplary flowchart illustrating processing of the Check Print Job function. FIG. 9B is an exemplary flowchart illustrating processing of the Get Print Job function. As the Check Print Job function, the GET method of HTTP is used. As the Get Print Job function, the GET method of HTTPS encrypted by the SSL communication is used. Programs relating to these flowcharts are installed in the PC 2, stored in the HDD 202, and read to the RAM 201 to be executed by the CPU 204.

In step S618 illustrated in FIG. 6 and step S705 illustrated in FIG. 7, when the MFP 3 calls the Check Print Job function, the proxy APP 143 executes processing of the Check Print Job function illustrated in FIG. 9A. As illustrated in FIG. 9A, in step S901, the processing of the Check Print Job function is started. In step S902, the proxy APP 143 checks the print job preparation completion (Print Job Ready) of the print job management database. In step S901, as query parameters of the GET request of HTTP, printer ID issued from the cloud printing APP 146 and a random code are transmitted from the MFP 3.

When the proxy APP 143 determines that "1" indicating completion of print job preparation has been set in the print job preparation completion (Print Job Ready), in other words, there is a print job for the MFP 3 (YES in step S903), the processing proceeds to step S904. On the other hand, when the proxy APP 143 determines that "0" indicating incompletion of print job preparation has been set, in other words, there is no print job for the MFP 3 (NO in step S903), the processing proceeds to step S905.

In step S904, the proxy APP 143 sets a response of "there is print job" in a response message included in a BODY of a response to the GET request of HTTP, and the processing proceeds to step S906. In step S905, the proxy APP 143 sets a response of "there is no print job" in the response message included in the BODY of the response to the GET request of HTTP, and the processing proceeds to step S906. In step S906, the proxy APP 143 transmits the response message to the issuance source (MFP 3 in the example) of the GET request. In step S907, the processing of the Check Print Job function is ended.

The response of "there is print job" and the response of "there is no print job" will be described in detail. Information indicating a state that there is a print job and information indicating a state that there is no print job are respectively "10101010" and "01010101". The response of "there is print job" and the response of "there is no print job" are results of calculation carried out using a random code and information indicating these states, and include, for example, character string information acquired by converting the following information into character strings:

response of "there is print job"=random code XOR 10101010
response of "there is no print job"=random code XOR 01010101

Thus, by using, for the response to the GET request of HTTP, character string information meaningless to the many rather than visible information defined by using the XML, an erroneous operation caused by illegal access to the web service API and illegal control can be prevented. The configuration for preventing such illegal access is not limited to this. More complex calculation such as hashing can be combined.

Figure 9B:
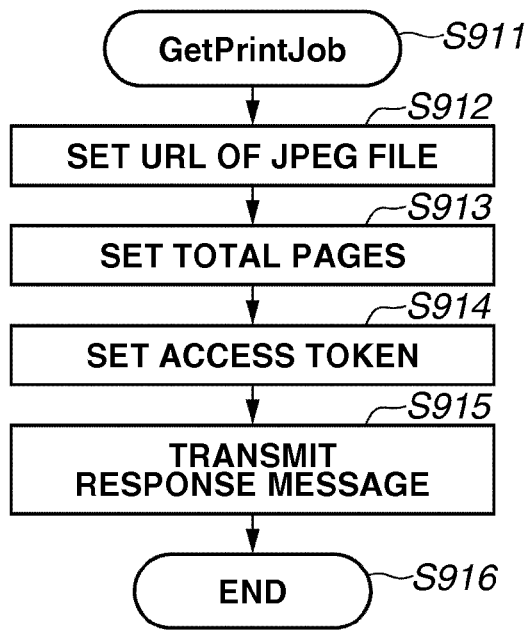

In step S708 illustrated in FIG. 7, after the MFP 3 has called the Get Print Job Function, the proxy APP 143 executes processing of the Get Print Job Function illustrated in FIG. 9B. As illustrated in FIG. 9B, in step S911, the proxy APP 143 starts the processing of the Get Print Job Function. In step S912, the proxy APP 143 sets a URL of a storage destination of a print image (JPEG file) in a response message included in a BODY of a response to the GET request of HTTPS. Then, the processing proceeds to step S913.

In step S913, the proxy APP 143 sets the total number of pages of the print image (JPEG file) in the response message included in the BODY of the response to the GET request of HTTPS, and the processing proceeds to step S914. In step S914, the proxy APP 143 sets an access token to the image conversion APP 144 in the response message included in the BODY of the response to the GET request of HTTPS, and the processing proceeds to step S915. In step S915, the proxy APP 143 transmits the response message to the issuance source (MFP 3 in the example) of the GET request to end the processing of the Get Print Job function.

Next, referring to FIGS. 10A and 10B, processing of the web service API exported from the proxy APP 143 and a thread function will be described. FIG. 10A is an exemplary flowchart illustrating processing of the Create Print Job Set function. FIG. 10B is an exemplary flowchart illustrating processing of a download/mage conversion thread function. As the Create Print Job Set function, the POST method of HTTP encrypted by the SSL communication is used. Programs relating to these flowcharts are installed in the PC 5, stored in the HDD 202, and read to the RAM 201 to be executed by the CPU 204.

Figure 10A:
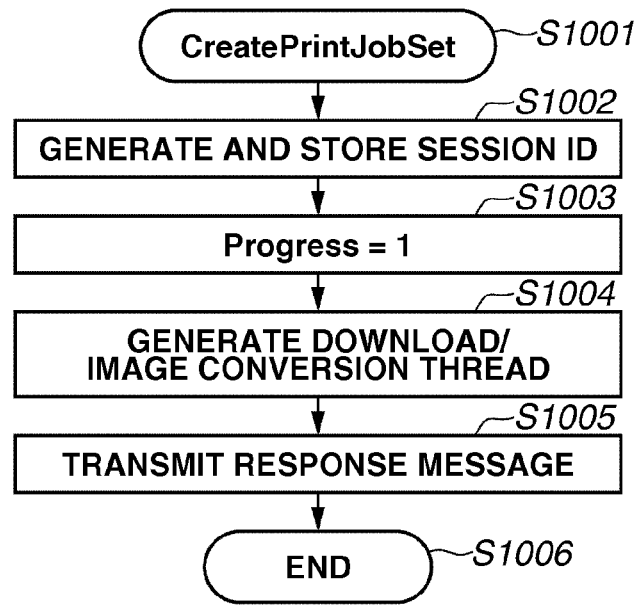
FIGS. 10A and 10B are exemplary flowcharts illustrating processing of an image conversion APP.
Figure 10B:
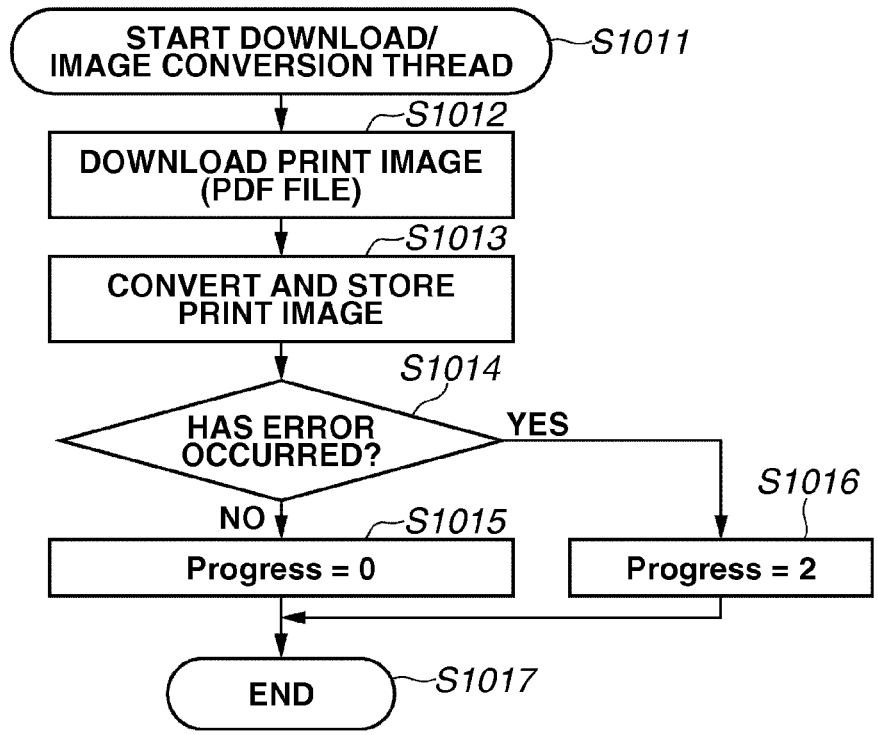

In step S612 illustrated in FIG. 6, when the proxy APP 143 calls the Create Print Job Set function, the image conversion APP 144 executes processing of the Create Print Job Set function illustrated in FIG. 10A. As illustrated in FIG. 10A, in step S1001, the image conversion APP 144 starts the processing of the Create Print Job Set function. In step S1002, the image conversion APP 144 generates session ID to store it in a session management database, and the processing proceeds to step S1003. The following information is stored in the session management database.

[Session Management Database]
search key: session ID issued from image conversion APP 144
  printer ID issued from cloud printing APP 146
  print job ID issued from cloud printing APP 146
  access token for using cloud printing services
  URL of storage destination of print image (PDF file)
  access token to image conversion APP 144
  print job access URL (URL of storage destination of JPEG file)
  progress situation indicating processing progress (Progress)

In this case, the image conversion APP 144 acquires the printer ID and the print job ID issued from the cloud printing APP 146 among the input parameters of the Create Print Job Set function. The image conversion APP 144 stores the printer ID and the print job ID issued from the cloud printing APP 146 in the session management database. The image conversion APP 144 acquires the access token for using cloud printing services among the input parameters of the Create Print Job Set function. The image conversion APP 144 stores the access token for using cloud printing services in the session management database. The image conversion APP 144 acquires the URL of storage destination of print image (PDF file) from among the input parameters of the Create Print Job Set function, and stores the URL of storage destination of print image (PDF file) in the session management database.

Then, in step S1003, the image conversion APP 144 sets "1" indicating ongoing processing in the progress situation (Progress) indicating the progress of processing in the session management database, and the processing proceeds to step S1004. In step S1004, the image conversion APP 144 generates a download/image conversion thread, and the processing proceeds to step S1005. Processing of the download/image conversion thread will be described below referring to FIG. 10B. In step S1005, the image conversion APP 144 sets SUCCESS indicating a normal successful end of the function and the session ID generated in step S1002 in a response message included in a BODY of a response to the POST request of HTTPS. The image conversion APP 144 then transmits the response message to an issuance source (proxy APP 143 in the example) of the POST request. In step S1006, the image conversion APP 144 ends the processing of the Create Print Job Set function.

After the image conversion APP 144 has generated the download/image conversion thread in step S1004, threads different from the Create Print Job Set are activated. Then, from among these threads, processing of the download/image conversion thread illustrated in FIG. 10B is executed. As illustrated in FIG. 10B, in step S1011, the image conversion APP 144 starts the processing of the download/image conversion thread. In step S1012, the image conversion APP 144 uses the access token for using cloud print services to access the URL of the storage destination of the print image (PDF file) by the GET method of HTTPS encrypted by the SSL communication. In other words, the image conversion APP 144 downloads the print image (PDF file) from the cloud print services to temporarily store it in the RAM 201.

After the downloading has been completed, the image conversion APP 144 converts the print image (PDF file) into a JPEG file printable by the MFP 3. In the HDD 202 of the PC 5, there is stored beforehand setting information indicating a printable form for each printer or MFP. In step S1013, the image conversion APP 144 stores the JPEG file in a folder including the printer ID and the print job ID issued from the cloud printing APP 146. In step S1013, the image conversion APP 144 sets an access token to the image conversion APP 144 in the access token to the image conversion APP 144 in the session management database. The access token to the image conversion APP 144 allows a printer or a MFP (MFP 3 in the example) to access the print image (JPEG file). The printer ID issued from the cloud printing APP 146 is associated with the printer or MFP. Further, in step S1013, the image conversion APP 144 sets a URL (1st page) of a storage destination of the print image (JPEG file) in the print job access URL in the session management database.

EXAMPLE

Printer ID: abcde
Print job ID: 1234
Total number of pages of print image (JPEG file): 3
Data storage in PC 2:
C:¥abcde1234¥
p1.jpg
p2.jpg
p3.jpg URL: www.abc.xxx/printdata/?pi=abcde&ji=1234&p=1

The URL indicates the JPEG file (p1.jpg) of the 1st page. Accordingly, to acquire a print image of each page, the MFP 3 sets a page number to be acquired, to a query parameter "p" indicating a page number. In step S1013, the image conversion APP 144 converts the print image (PDF file), and deletes the print image (PDF file) downloaded in step S1012 from the RAM 201 after the print images (JPEG files) of all the pages have been converted. In step S1014, the image conversion APP 144 determines whether an error has been detected in any one of steps S11011 to S1013. In this case, when the image conversion APP 144 determines that an error has been detected (YES in step S1014), the processing proceeds to step S1016. When no error has been detected (NO in step S1014), the processing proceeds to step S1015 determining that the processing has normally ended.

In step S1015, the image conversion APP 144 sets "0" indicating a normal end to the progress situation (Progress) within the session management database. In step S1017, the image conversion APP 144 ends the processing of the download/image conversion thread. In step S1016, the image conversion APP 144 sets "2" indicating an error end to the progress situation (Progress) within the session management database. In step S1017, the image conversion APP 144 ends the processing of the download/image conversion thread. In step S1017, the image conversion APP 144 deletes information regarding the print job from the session management data base to update the session management database.

Next, referring to FIGS. 11A and 11B, processing of the web service API exported from the image conversion APP 144 will be described. FIG. 11A is an exemplary flowchart illustrating processing of a Confirm Progress function. FIG. 11B is an exemplary flowchart illustrating processing of a Job Complete function. For the Confirm Progress function, the GET method of HTTP is used. For the Job Complete function, the POST method of HTTPS encrypted by the SSL communication is used. Programs relating to these flowcharts are installed in the PC 5, stored in the HDD 202, and read to the RAM 201 to be executed by the CPU 204.

Figure 11A:
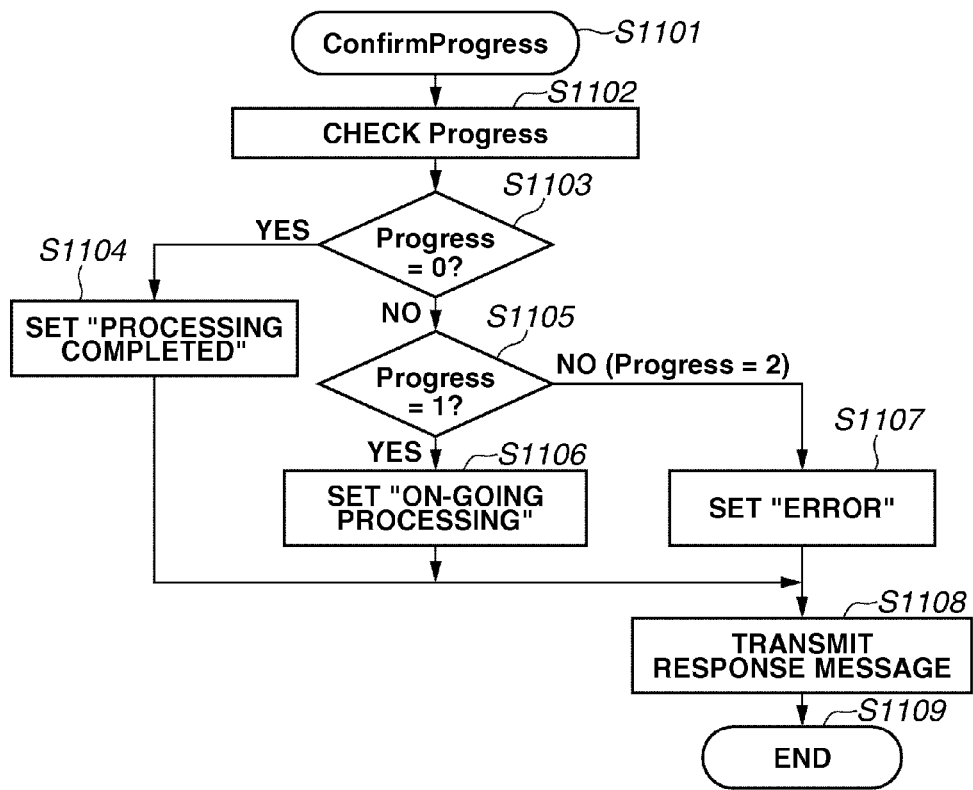
FIGS. 11A and 11B are exemplary flowcharts illustrating processing of the image conversion APP.

After the proxy APP 143 has called the Confirm Progress function in step S614 illustrated in FIG. 6, the image conversion APP 144 executes processing of a Confirm Progress function illustrated in FIG. 11A. As illustrated in FIG. 11A, in step S1101, the image conversion APP 144 starts the processing of the Confirm Progress function. In this case, a GET request of HTTP for the Confirm. Progress function includes session ID and a sequence as query parameters. The sequence is an arbitrary number generated by an issuance source (proxy APP 143 in the example).

Then, in step S1102, the image conversion APP 144 checks a progress situation in the session management database by using the session ID included in the query parameters as a search keyword. In step S1103, the image conversion APP 144 determines whether "0" indicating a normal end has been set in the progress situation. When "0" has been set (YES in step S1103), the processing proceeds to step S1104. On the other hand, when the image conversion APP 144 determines that a numeral other than "0" ("1" or "2") has been set (NO in step S1103), the processing proceeds to step S1105.

In step S1104, the image conversion APP 144 sets "processing completion response" in a response message included in a BODY of a response to the GET request of HTTP, and the processing proceeds to step S1108. In step S1105, the image conversion APP 144 checks a progress situation (Progress). In this case, when the image conversion APP 144 determines that "1" indicating ongoing processing has been set in the progress situation (Progress) (YES in step S1105), the processing proceeds to step S1106. On the other hand, when the image conversion APP 144 determines that a numeral other than "1" ("2") has been set, the processing proceeds to step S1107.

In step S1106, the image conversion APP 144 sets "ongoing processing response" in the response message included in the BODY of the response to the GET request of HTTP, and the processing proceeds to step S1108. In step S1107, the image conversion APP 144 sets "error response" in the response message included in the BODY of the response to the GET request of HTTP, and the processing proceeds to step S1108. In step S1108, the image conversion APP 144 transmits the response message to an issuance source (proxy APP 143) of the GET request. In step S1109, the image conversion APP 144 ends the processing of the Confirm Progress function.

"Processing completion response", "ongoing processing response", and "error response" will be described in detail. These responses are results of calculation carried out by using sequences included in the query parameters of the GET request in step S1101, and include, for example, character string information acquired by converting the following information into character strings:
"processing completion response"=sequence
"ongoing processing response"=sequence+1
"error response"=sequence+2

Thus, by using, for the response to the GET request of HTTP, character string information meaningless to the many rather than visible information defined by using the XML, an erroneous operation caused by illegal access to the web service API and illegal control can be prevented. The configuration for preventing such illegal access is not limited to this. More complex calculation such as hashing can also be combined.

Figure 11B:
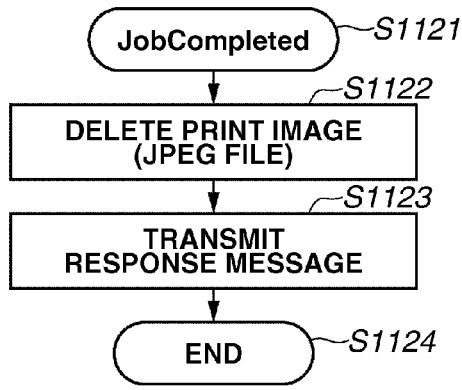

After the proxy APP 143 has called the Job Completed function in step S803 illustrated in FIG. 8, the image conversion APP 144 executes processing of a Job Completed function in FIG. 11B. As illustrated in FIG. 11B, in step S1121, the image conversion APP 144 starts the processing of the Job Completed function. In step S1122, the image conversion APP 144 deletes the print image (JPEG file), and the processing proceeds to step S1123. In step S1123, the image conversion APP 144 sets SUCCESS indicating a normal end in a response message included in a BODY of a response to the POST request of HTTPS. The image conversion APP 144 then transmits the response message to an issuance source (proxy APP 143 in the example) of the POST request. In step S1124, the image conversion APP 144 ends the processing of the Job Completed function.

Next, referring to FIG. 12, processing of the web service API exported from the image conversion APP 144 will be described. FIG. 12 is an exemplary flowchart illustrating processing of a Create Print Job Result function. For the Create Print Job Result function, the POST method of HTTPS encrypted by the SSL communication is used. A program relating to the flowchart is installed in the PC 5, stored in the HDD 202, and read to the RAM 201 to be executed by the CPU 204.

After the proxy APP 143 has called the Create Print Job Result function in step S701 illustrated in FIG. 7, the image conversion APP 144 executes processing of a Create Print Job Result function illustrated in FIG. 12. As illustrated in FIG. 12, in step S1201, the image conversion APP 144 starts the processing of the Create Print Job Result function. Then, in step S1202, the image conversion APP 144 sets an access token to the image conversion APP 144 in a response message included in a BODY of a response to the POST request of HTTPs, and the processing proceeds to step S1203.

In step S1203, the image conversion APP 144 sets a print job access URL (URL of storage destination of JPEG file) in the response message included in the BODY of the response to the POST request, and the processing proceeds to step S1204. In step S1204, the image conversion APP 144 sets a total number of pages of the print image (JPEG file) in the response message included in the BODY of the response to the POST request, and the processing proceeds to step S1205. In step S1205, the image conversion APP 144 transmits the response message to an issuance source (proxy APP 143 in the example) of the POST request. In step S1206, the image conversion APP 144 ends the processing of the Create Prig Job function.

Figure 13A:
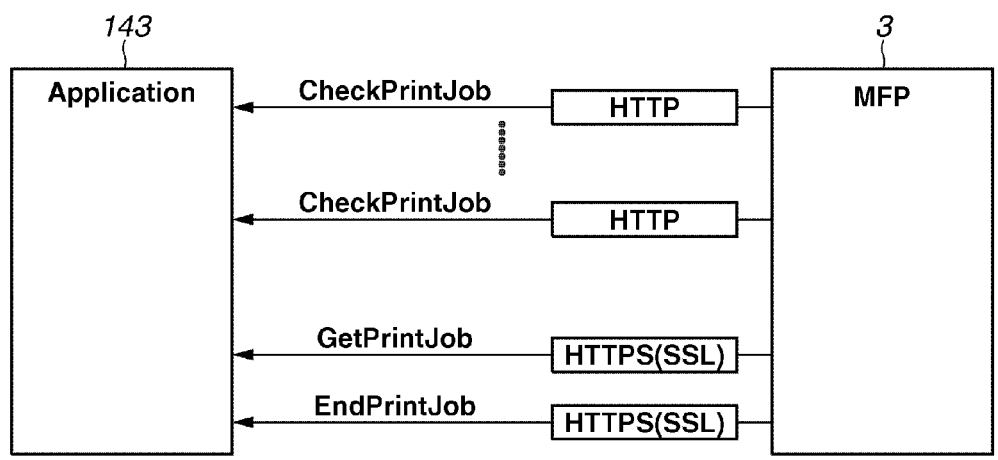
FIGS. 13A and 13B illustrate examples of calling sequences.
Figure 13B:
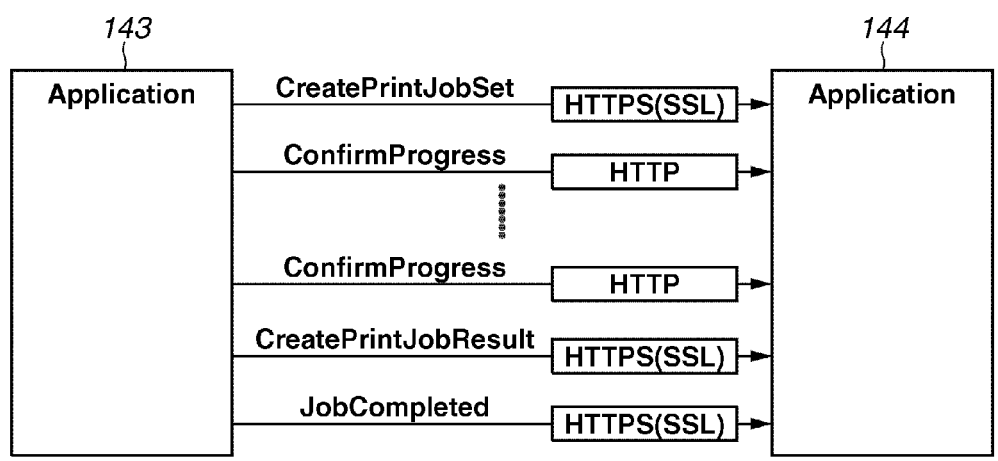

FIGS. 13A and 13B illustrate examples of calling sequences of the web service API. FIG. 13A illustrates an example of a calling sequence between the proxy APP 143 and the MFP 3. FIG. 13B illustrates an example of a calling sequence between the proxy APP 143 and the image conversion APP 144. As illustrated in FIG. 13A, between the proxy APP 143 and the MFP 3, the MFP 3 calls the web service API exported from the proxy APP 143. Specifically, the MFP 3 calls the web service API exported from the proxy APP 143 in an order of the Check Print Job function, the Get Print Job function, and the End Print Job function.

For the Check Print Job function (only for polling processing), the unencrypted GET method of HTTP is used. For all the other functions, the GET method of HTTPS encrypted by the SSL communication is used. Thus, by using the unencrypted HTTP method of polling only for checking presence of a print job, in a peripheral apparatus control system, time for polling is reduced and high user operability can be achieved. Since loads of the polling can be reduced, thereby eliminating, for example, the necessity of a configuration to deal with the loads, system construction and firmware mounting of the printer or the MFP are facilitated, and development costs can be reduced.

As illustrated in FIG. 13, between the proxy APP 143 and the image conversion APP 144, the proxy APP 143 calls the web service API exported from the image conversion APP 144. Specifically, the proxy APP 143 calls the web service API exported from the image conversion APP 144 in an order of the Create Print Job Set function, the Confirm Progress function, the Create Print Job Result function, and the Job Completed function.

For the Confirm Progress function (only for polling processing), the unencrypted GET method of HTTP is used. For all the other functions, the POST method of HTTPS encrypted by the SSL communication is used. Thus, by using the unencrypted HTTP method of polling only for checking the progress situation of processing, in a peripheral apparatus control system, time for polling is reduced and high user operability can be achieved. Since loads of the polling can be reduced, thereby eliminating, for example, the necessity of a configuration to deal with the loads, system construction and mounting of applications are facilitated, and development and running costs can be reduced.

The first exemplary embodiment has been directed to the personal computer as the information processing apparatus. However, the present invention is not limited to the personal computer. The present invention can also be effectively applied to an arbitrary information processing apparatus (terminal) that can use a similar method, such as a digital versatile disc (DVD) player, a game player, a set top box, or Internet home electrical appliance. The first exemplary embodiment has been described taking the MFP as an example of the peripheral apparatus. However, as the peripheral apparatus, any other apparatuses such as a copying machine, a facsimile, a scanner, a digital camera, or an apparatus including a multifunction peripheral combining these apparatuses can be used.

In the first exemplary embodiment, the OS equivalent to that of the Windows is used as an example of the OS. Not limited to the Windows, however, any arbitrary OS can be used. In the first exemplary embodiment, the Ethernet is used as a configuration example of the network 4. Not limited to this example, however, any other arbitrary network configuration can be used.

In the first exemplary embodiment, the Ethernet is employed as interfaces between the PC1, the PC 2, the PC 5, and the PC 7 and the MFP 3 and the MFP 10. Not limited to this interface, however, an arbitrary interface such as a wireless LAN, Institute of Electrical and Electronics Engineers (IEEE) 1394, Bluetooth (registered trademark), or a universal serial bus (USB) can be used. Functions of various applications (firmware), and some or all of the processes of the flowcharts can be configured by using dedicated hardware.

According to the exemplary embodiment, time necessary for checking the progress situation of the image conversion processing or presence of a print job by way of polling is reduced, and thus operability can be improved for the user. Further, even when the cloud system is used for the peripheral apparatus control system, system construction and application mounting are facilitated, and development and running costs can be reduced. Further, since no problem occurs in mounting a low-performance inexpensive printer or MFP or the firmware of the multifunction peripheral, and time for processing is reduced, operability can be improved for the user.

The present invention can also be realized by executing the following processing. Specifically, software (program) for realizing the functions of the exemplary embodiment is supplied to a system or an apparatus via a network or various storage media, and a computer (or CPU or microprocessor unit (MPU)) of the system or the apparatus reads the program to execute it.

According to the configuration of the exemplary embodiment, communication can be more appropriately carried out between apparatuses. The exemplary embodiments have been described by taking the example of the peripheral apparatus control system that registers one user account in association with the MFP, by using the access token acquired by the cloud printing APP 146 through authentication based on one user account and a password for the user account with respect to a certain MFP (e.g., MFP 3). The present exemplary embodiment is directed to an example of a peripheral apparatus control system that allows a plurality of users to share a certain MFP 3 by registering a plurality of user accounts in association with the MFP 3.

Figure 14:
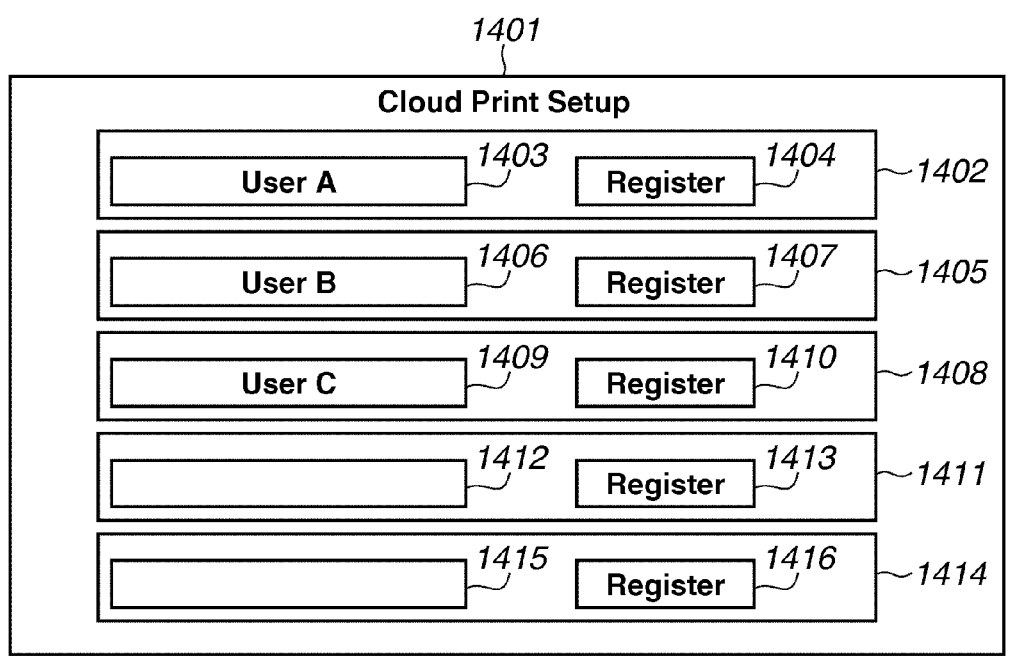
FIG. 14 illustrates an example of a screen.

FIG. 14 illustrates an example of a screen of a display unit 21 of the MFP 3, specifically, a cloud printing set-up screen 1401. Printer registration operation units 1402, 1405, 1408, 1411, and 1414 respectively include user name input units 1403, 1406, 1409, 1412, and 1415, and registration buttons 1404, 1407, 1410, 1413, and 1416. Currently, the MFP 3 is shared by three users. Accordingly, user names "User A", "User B", and "User C" are respectively set in the user name input units 1403, 1406, and 1409, while no user name is set in the user name input unit 1412.

The registration button 1404 is operated to register the MFP 3 in cloud printing services provided by the cloud printing APP 146, for the user "User A" of the user name input unit 1403. The registration button 1407 is operated to register the MFP 3 in the cloud printing services provided by the cloud printing APP 146, for the user "User B" of the user name input unit 1406. The registration button 1410 is operated for registering the MFP 3 in the cloud printing services provided by the cloud printing APP 146 for the user "User C" of the user name input unit 1409.

The registration button 1413 is operated for registering the MFP 3 in the cloud printing services provided by the cloud printing APP 146 for the user of the user name input unit 1412. The registration button 1416 is operated for registering the MFP 3 in the cloud printing services provided by the cloud printing APP 146 for the user of the user name input unit 1415. Currently, there are no names set in the printer name input units 1412 and 1415. Thus, the registration buttons 1413 and 1416 do not function.

Figure 15:
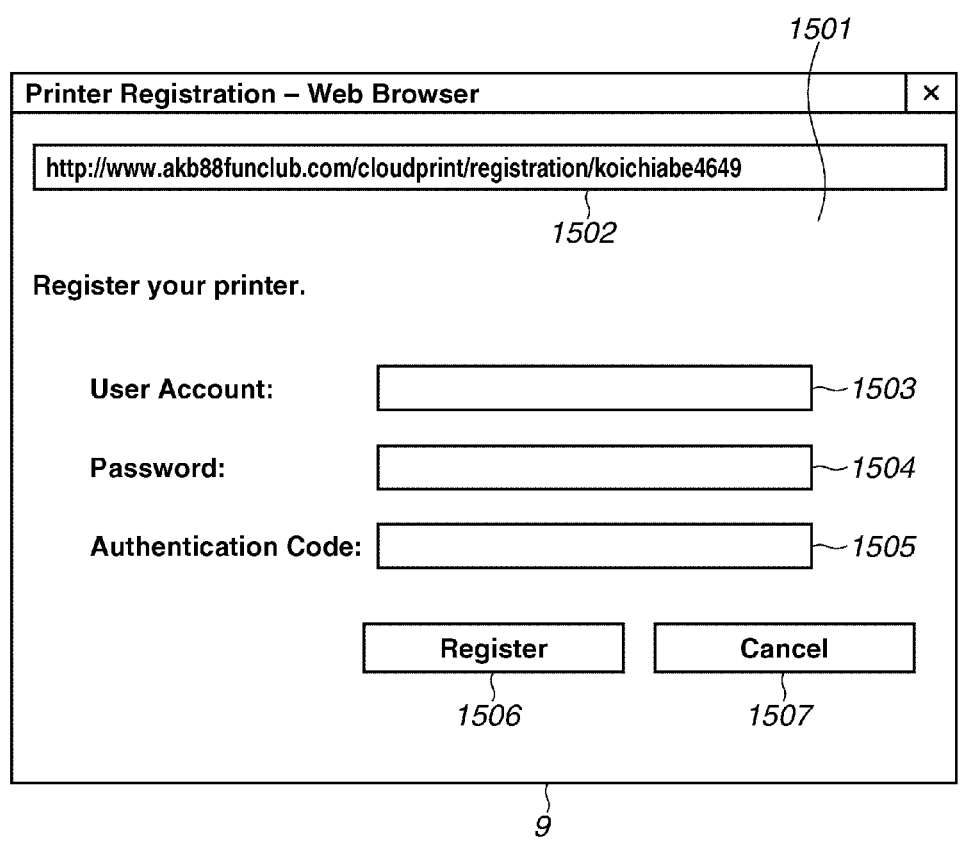
FIG. 15 illustrates an example of a screen.

FIG. 15 illustrates an example of a printer registration page for executing user authentication when a printer is registered in the cloud printing services. The user carries out, by using a printer registration page 1501 illustrated in FIG. 15, user authentication and printer registration necessary for using the cloud printing services provided by the cloud printing APP 146. A page of a web site designated by a uniform resource locator (URL) input unit 1502 of a web browser 9 is displayed. The user inputs a user account and a password necessary for using the cloud printing services to a user account input unit 1503 and a password input unit 1504.

The user inputs a temporary authentication code (token) for printer registration, which has been issued from the cloud printing APP 146, to an authentication code (token) input unit 1505. When the user presses a registration button 1506, the printer is temporarily registered in the cloud printing services. When the user presses a cancel button 1507, the processing for registering the printer in the cloud printing services is canceled.

Figure 16:
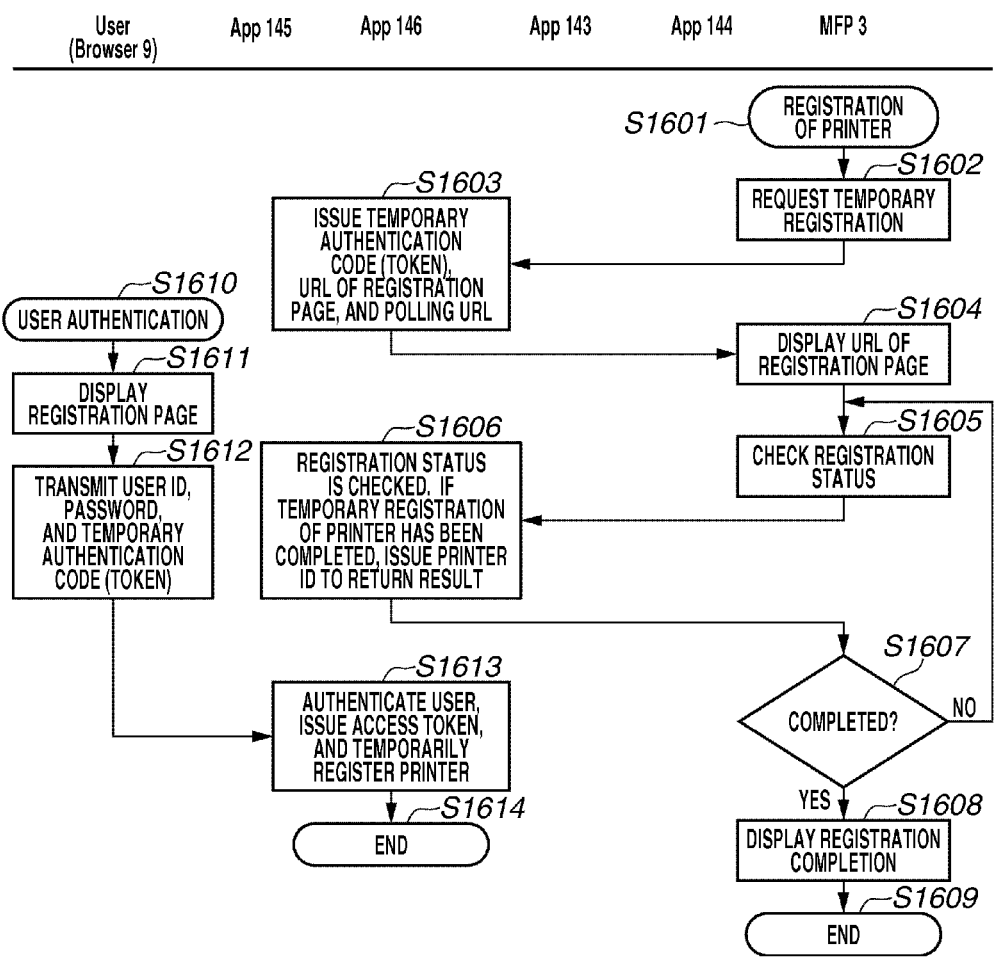
FIG. 16 is an exemplary flowchart illustrating processing for registering a printer.

FIG. 16 is an exemplary flowchart illustrating processing for registering a printer in the cloud printing services. A program of this flowchart is installed in a PC or a MFP. A program of an application operated on the PC is stored in a HDD 202, and read to a RAM 210 and executed by a CPU 204. A program of an application operated on the MFP is stored in a ROM 16, and read to a RAM 17 and executed by a CPU 25.

In the flowchart, a vertical row represents a processing execution side. In the present exemplary embodiment, there are illustrated, from the left side, a user (web browser 9), a document creation APP 145, a cloud printing APP 146, a proxy APP 143, an image conversion APP 144, and a MFP 3. Hereinafter, a communication control method will be described by way of example where the user registers the MFP 3 in the cloud printing services provided by the cloud printing APP 146 by using the MFP 3 and the PC 1.

When the user operates the display unit 21 of the MFP 3 to open the cloud printing set-up screen 1401 illustrated in FIG. 14, and presses the registration button 1404 for the user "User A" in the user name input unit 1403, in FIG. 16, in step S1601, printer registration processing is started. In step S1602, the MFP 3 requests the cloud printing APP 146 to temporarily register the printer. Then, in step S1603, the cloud printing APP 146 issues a temporary authentication code (token) for printer registration, a URL of a printer registration page, and a polling URL. In step S1604, the MFP 3 displays the temporary authentication code (token) and the URL of the printer registration page issued from the cloud printing APP 146 on the display unit 21, and the processing proceeds to step S1605.

Then, in step S1610, the user starts user authentication processing for registering the MFP 3 in the cloud printing services provided by the cloud printing APP 146. In step S1611, the user activates the web browser 9 in the PC 1, and inputs the URL of the printer registration page to the URL input unit 1502 to open a printer registration page designated by the cloud printing APP 146.

Then, the user respectively inputs a user account and a password created beforehand for using the cloud printing services, to the user account input unit 1503 and the password input unit 1504, and inputs the temporary authentication code (token) to the authentication code (token) input unit 1605. When the user presses the registration button 1506, in step S1612, the web browser 9 transmits the user account, the password, and the temporary authentication code (token) input on the printer registration page 1501 to the cloud printing APP 146.

In step S1613, the cloud printing APP 146, which has received the user account, the password, and the temporary authentication code (token) from the web browser 9, executes user authentication, and issues, when the authentication is successful, an access token necessary for using the cloud printing services to temporarily register the MFP 3 in the cloud printing services. In step S1614, thus, the user authentication processing is ended, temporarily registering the MFP 3 in the cloud printing services.

In step S1605, the MFP 3 accesses the polling URL to make an inquiry to check the registered status of the printer (MFP 3) to the cloud printing APP 146. The cloud printing APP 146, which has received the inquiry, checks the registered status of the printer 3 (MFP 3). In step S1606, when the temporary registration of the printer (MFP 2) has been completed, the cloud printing APP 146 issues printer ID for the printer (MFP 3) to really register the printer, transmits the printer ID and the access token to the MFP 3, and returns the completion result of the real registration of the printer (MFP 3) to the MFP 3. The printer ID is represented by a unique value allocated to the MFP 3 by the cloud printing APP 146 to be exclusively used for the user "User A" designated by the user name input unit 1403.

When the temporary registration of the printer (MFP 3) has not been completed, in step S1606, the cloud printing APP 146 returns the incompletion result of the real registration of the printer to the MFP 3. When the MFP 3 has received the completion result of the real registration of the printer (MFP 3) (YES in step S1607), the processing proceeds to step S1608. When the MFP 3 has received the incompletion result of the real registration of the printer (MFP 3) (NO in step S1607), the processing returns to step S1605. In step S1508, the MFP 3 displays a message indicating the completion of the real registration of the printer in the cloud printing services on the display unit 21. Then, in step S1609, the printer registration processing is ended.

When the user operates the display unit 21 of the MFP 3 to open the cloud printing set-up screen 1401 illustrated in FIG. 14, and presses the registration button 1407 for the user "User B" in the user name input unit 1406, the printer registration processing and the user authentication processing are carried out according to the flowchart of FIG. 16. In this case, in step S1606, the cloud printing APP 146 issues printer ID for the MFP 3. The printer ID is represented by a unique value allocated to the MFP 3 by the cloud printing APP 146 to be exclusively used for the user "User B" designated by the user name input unit 1406.

When the user operates the display unit 21 of the MFP 3 to open the cloud printing set-up screen 1401 illustrated in FIG. 14, and presses the registration button 1410 for the user "User C" in the user name input unit 1409, the printer registration processing and the user authentication processing are carried out according to the flowchart of FIG. 16. In this case, in step S1606, the cloud printing APP 146 issues printer ID for the MFP 3. The printer ID is represented by a unique value allocated to the MFP 3 by the cloud printing APP 146 to be exclusively used for the user "User C" designated by the user name input unit 1409.

Thus, the cloud printing APP 146 issues printer IDs represented by different unique values among a plurality of users (user accounts) to one MFP (MFP 3). This allows the plurality of users to share one MFP. As a result, use purposes and a use range of the MFP can be widened, and high operability can be achieved.

The exemplary embodiment has directed to the example where the proxy APP 143 receives the print job notification in the cloud printing services provided by the cloud printing APP 146. In this example, in steps S618 to S621 illustrated in FIG. 6, the MFP 3 checks presence of a print job for the proxy APP 143 by executing polling at the fixed intervals (in the example, 1 minute). Thus, the MFP 3 cannot always start printing immediately after reception of the print job notification by the proxy APP 143, and a delay of an interval amount (1 minute) at the longest may occur. An example of a peripheral apparatus control system than can shorten the time from the reception of the print job notification to the start of printing to achieve shorter total printing time will be described.

Figure 17:
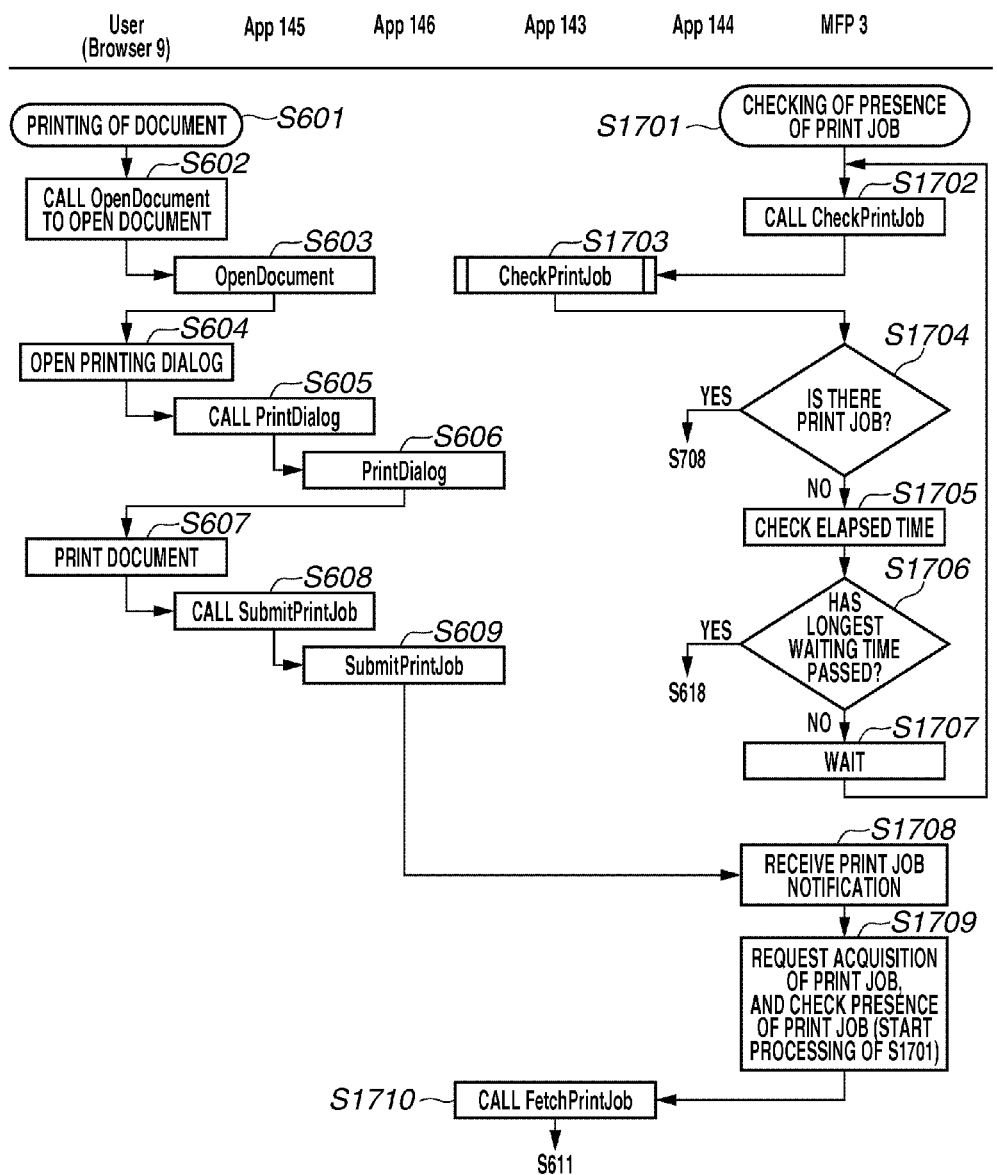
FIG. 17 is an exemplary flowchart illustrating processing of an entire peripheral apparatus control system.

FIG. 17 is an exemplary flowchart illustrating processing for the entire peripheral apparatus control system. A program of this flowchart is installed in the PC or the MFP. A program of an application operated on the PC is stored in the HDD 202, and read to the RAM 210 and executed by the CPU 204. A program of an application operated on the MFP is stored in the ROM 16, and read to the RAM 17 and executed by the CPU 25.

In the flowchart, a vertical row represents a processing execution side. In the present exemplary embodiment, there are illustrated, from the left side, a user (web browser 9), a document creation APP 145, a cloud printing APP 146, a proxy APP 143, an image conversion APP 144, and a MFP 3. Hereinafter, a communication control method will be described by way of example where the user prints a document (series of processes for document printing) at the MFP 3 by using the PC 1.

In the flowchart, steps denoted by same reference numerals as FIGS. 6 and 7 are the processing similar to those illustrated in FIGS. 6 and 7, and thus description thereof will be omitted. In addition, portions not described are similar in contents to those illustrated in FIGS. 6 and 7.

In FIG. 17, in step S601, document printing seen from the user side is started. Then, steps S602 to S609 are sequentially carried out. In step S609, the cloud printing APP 146 transmits a print job notification to the printer MFP 3 associated with a selected printer choice. As the print job notification, for example, a protocol referred to as extensible messaging and presence protocol (XMPP) can be employed, which is used in an instant messenger. The print job notification that the cloud printing APP 146 sends to the printer MFP 3 in step S609, uses an unencrypted XMPP. In step S1708, the MFP 3 receives the print job notification, and the processing proceeds to step S1709. In step S1709, the MFP 3 requests the proxy APP 143 to acquire a print job, and starts processing for checking presence of a print job of step S1701. In step S1710, the proxy APP 143, which has received the print job acquisition request from the MFP 3, calls a Fetch Print Job function of the web service API exported from the cloud printing APP 146. Then, the processing proceeds to step S611, and the processing of step S611 and after illustrated in FIG. 6 is executed.

When the processing for checking presence of a print job is started in step S1710, in step 1702, the MFP 3 calls a Check Print Job function of the web service API exported from the proxy APP 143. Information (example of checking information) transmitted as a query parameter of a GET request of a HTTP to the proxy APP 143 when the MFP 3 calls the function in step 1702 is similar to that in step S618 illustrated in FIG. 6. In step S1703, after the Check Print Job function has been called, the proxy APP 143 executes processing of the Check Print Job function illustrated in FIG. 9A, and returns its response (example of response information) to the MFP 3.

Then, in step S1704, the MFP 3, which has received the response of the Check Print Job function from the proxy APP 143, checks information (response of "there is job" or response of "there is no job") contained in a response message included in the response. When the MFP 3 determines reception of the response of "there is job" (YES in step S1704), the processing proceeds to step S708. On the other hand, when the MFP 3 determines reception of the response of "there is no job" (NO in step S1704), the processing proceeds to step S1705.

In step S1705, the MFP 3 checks elapsed time from the start of the processing for checking the presence of a print job in step S1701, and the processing proceeds to step S1706. When longest waiting time (5 minutes in the present exemplary embodiment) has elapsed (YES in step S1706), the processing proceeds to step S618. When not (NO in step S1706), the processing proceeds to step S1707.

In step S1707, after the MFP 3 has waited for fixed time (1 second in the present exemplary embodiment), the processing proceeds to step S1702. Thus, the MFP 3 polls the Check Print Job function exported from the proxy APP 143 at the fixed time interval (periodically). However, while the polling interval in steps S618 to S621 is 1 minute in the first exemplary embodiment, polling can be executed at the time interval of 1 second in the second exemplary embodiment. This can greatly shorten the printing start time, and achieve shorter total printing time.

In the first exemplary embodiment, the polling is executed irrespective of presence of a print job. Thus, when polling is frequently carried out to the proxy APP 143 from a great many number of printers, greater loads are imposed on the proxy APP 143, necessitating a larger system. This increases running costs of the cloud system. In some cases, the cloud system may be overloaded and cannot properly function, making the entire system unstable. However, in the second embodiment, the polling is carried out only when there is a print job, and a very small number of printers among whole printers are targeted. Thus, loads on the system are limited even when the polling interval is shortened. As a result, there is no need to use a large system, and running costs of the cloud system can be reduced. Further The entire system can be maintained in a stable state.

When the elapsed time from the start of the processing for checking the presence of a print job, namely, the elapsed time from the reception of the print job notification, has passed the longest waiting time (YES in step S1706), presuming that abnormality has occurred in the cloud printing services, intervals of polling thereafter are set sufficiently long. Thus, continued polling at short intervals for a long time can be prevented, and the system can be maintained in a stable state.

Since the MFP 3 can check, after the reception of the print job notification from the cloud printing APP 146, the presence of a print job at the very short interval from that time, printing start time can be shortened, and total printing time can be shorter.

There may be a case where after the user has started printing, when power for the MFP 3 is turned off, a print job notification cannot be received. To deal with such a case, when the power is turned on for the MFP 3, step S1701 is executed at least once, or for a fixed period. Accordingly, the print job started by the user can surely be printed when the power of the MFP 3 is turned on.

The exemplary embodiment can be further improved. When the print job notification is transmitted to the MFP 3 from the cloud printing APP 146, processing can be executed on the premise that there is a print job. In step S1709, the MFP 3 starts (activates) processing for checking presence of a print job (step S1701). The processing directly proceeds to step S1704 without executing step S1702. Determination of step S1704 is unconditionally set to be YES, and the processing proceeds to step S708. Accordingly, the cloud printing APP 146 transmits an unencrypted print job notification to the MFP 3. The MFP 3, which has received the unencrypted print job notification, calls the Get Print Job function exported from the proxy APP 143 by a GET method of HTTP encrypted through Secure Sockets Layer (SSL) communication.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium). In an example, a computer-readable storage medium may store a program that causes a peripheral apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-179798 filed Aug. 19, 2011, which is hereby incorporated by reference herein in its entirety.

What is claimed is:

1. A peripheral apparatus capable of communicating with a management apparatus, wherein the management apparatus manages information of print data, the peripheral apparatus comprising:

a memory, a hardware communication unit configured to utilize an encrypted communication method or an unencrypted communication method; and a control unit stored in the memory and configured to control the communication unit, wherein, when the control unit periodically requests checking information for determining whether there is information to be acquired by the peripheral apparatus, the control unit causes the communication unit to request the checking information utilizing the unencrypted communication method, wherein, when requesting print data acquisition information that includes an access token for acquiring the print data, which is different from the periodical requesting of the checking information, the control unit causes the communication unit to request the print data acquisition information from the management apparatus utilizing the encrypted communication method, and wherein, when an elapsed time of a state, where there is no information to be acquired by the peripheral apparatus, passes a predetermined time, the control unit changes a time interval of causing the communication unit to request the checking information, from a first time interval to a second time interval which is longer than the first time interval, and wherein the peripheral apparatus is an apparatus that includes at least one of a printer, a copying machine, a facsimile, a scanner, and a digital camera.

2. The peripheral apparatus according to claim 1, wherein the communication unit periodically transmits the checking information to the management apparatus.

3. The peripheral apparatus according to claim 1, wherein the unencrypted communication method is a HTTP GET method.

4. The peripheral apparatus according to claim 3, wherein the encrypted communication method is a HTTPS GET method.

5. The peripheral apparatus according to claim 1, further comprising a receiving unit stored in the memory and configured to receive a print job notification, wherein, when the receiving unit receives the print job notification, the control unit causes the communication unit to request the checking information periodically at a fixed time interval, and wherein, when the receiving unit does not receive the print job notification, the control unit does not cause the communication unit to request the checking information.

6. The peripheral apparatus according to claim 5, wherein, when power of the peripheral apparatus is turned on, processing for requesting the checking information is started.

7. The peripheral apparatus according to claim 5, wherein the print data acquisition information includes information indicating a storage location of the print data, a number of pages of the print data, and an access token for accessing an apparatus in which the print data is to be stored.

8. A communication control method for a peripheral apparatus capable of communicating with a management apparatus, wherein the management apparatus manages information of print data, the communication control method comprising:

utilizing an encrypted communication method or an unencrypted communication method via a hardware communication unit; and controlling, via a control unit stored in a memory, the communication unit, wherein, when the control unit periodically requests checking information for determining whether there is information to be acquired by the peripheral apparatus, the control unit causes the communication unit to request the checking information utilizing the unencrypted communication method, wherein, when requesting print data acquisition information that includes an access token for acquiring the print data, which is different from the periodical requesting of the checking information, the control unit causes the communication unit to request the print data acquisition information from the management apparatus utilizing the encrypted communication method, wherein, when an elapsed time of a state, where there is no information to be acquired by the peripheral apparatus, passes a predetermined time, the control unit changes a time interval of causing the communication unit to request the checking information, from a first time interval to a second time interval which is longer than the first time interval, and wherein the peripheral apparatus is an apparatus that includes at least one of a printer, a copying machine, a facsimile, a scanner, and a digital camera.

9. The communication control method according to claim 8, wherein the unencrypted communication method is a HTTP GET method.

10. The communication control method according to claim 9, wherein the encrypted communication method is a HTTPS GET method.

11. A non-transitory computer-readable storage medium storing a program that causes a peripheral apparatus to perform a communication control method, wherein the peripheral apparatus is capable of communicating with a management apparatus, wherein the management apparatus manages information of print data, the communication control method comprising:

utilizing an encrypted communication method or an unencrypted communication method via a hardware communication unit; and controlling, via a control unit stored in a memory, the communication unit, wherein, when the control unit periodically requests checking information for determining whether there is information to be acquired by the peripheral apparatus, the control unit causes the communication unit to request the checking information utilizing the unencrypted communication method, wherein, when requesting print data acquisition information that includes an access token for acquiring the print data, which is different from the periodical requesting of the checking information, the control unit causes the communication unit to request the print data acquisition information from the management apparatus utilizing the encrypted communication method, wherein, when an elapsed time of a state, where there is no information to be acquired by the peripheral apparatus, passes a predetermined time, the control unit changes a time interval of causing the communication unit to request the checking information, from a first time interval to a second time interval which is longer than the first time interval, and wherein the peripheral apparatus is an apparatus that includes at least one of a printer, a copying machine, a facsimile, a scanner, and a digital camera.

* * * * *